US011575452B2

(12) United States Patent
Merlin et al.

(10) Patent No.: US 11,575,452 B2
(45) Date of Patent: Feb. 7, 2023

(54) PASSIVE POSITIONING WITH RADIO FREQUENCY SENSING

(71) Applicant: QUALCOMM Incorporated, San Diego, CA (US)

(72) Inventors: Simone Merlin, San Diego, CA (US); Bibhu Mohanty, Del Mar, CA (US); Daniel Hendricus Franciscus Dijkman, Haarlem (NL); Farhad Ghazvinian Zanjani, Almere (NL); Ilia Karmanov, Amsterdam (NL); Brian Michael Buesker, San Diego, CA (US); Harshit Joshi, San Diego, CA (US); Vamsi Vegunta, San Diego, CA (US); Ishaque Ashar Kadampot, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 17/229,798

(22) Filed: Apr. 13, 2021

(65) Prior Publication Data

US 2022/0329330 A1    Oct. 13, 2022

(51) Int. Cl.
*H04B 17/318* (2015.01)
*H04W 4/02* (2018.01)
(Continued)

(52) U.S. Cl.
CPC .......... *H04B 17/318* (2015.01); *H04W 4/025* (2013.01); *H04W 16/20* (2013.01); *H04W 24/02* (2013.01); *H04W 64/003* (2013.01)

(58) Field of Classification Search
CPC .... H04B 17/318; H04W 4/025; H04W 16/20; H04W 24/02; H04W 64/003
See application file for complete search history.

(56) References Cited

U.S. PATENT DOCUMENTS 9,964,468 B1 *   5/2018   Wu ........................ G01M 5/00
2017/0154140 A1 *   6/2017   Wilson ..................... G06N 5/04
(Continued)

FOREIGN PATENT DOCUMENTS

| WO | 2016066820 A1 | 5/2016 |
| WO | 2020185209 A1 | 9/2020 |
| WO | 2021043126 A1 | 3/2021 |

OTHER PUBLICATIONS

Hashimoto S., et al., "A Notification Environment Using User-Installed Beacons", 2017 Tenth International Conference On Mobile Computing and Ubiquitous Network (ICMU), IPSJ, Oct. 3, 2017 (Oct. 3, 2017), pp. 1-4, XP033343501, DOI: 10.23919/ICMU.2017.8330078 [retrieved on Apr. 2, 2018] Sections I-IV., figures 1-7.

(Continued)

*Primary Examiner* — Siu M Lee
(74) *Attorney, Agent, or Firm* — Satheesh Karra

(57) ABSTRACT

Disclosed are systems, methods, and non-transitory media for sensing radio frequency signals. For instance, radio frequency data can be received by an apparatus and from at least one wireless device in an environment. Based on the radio frequency data received from the at least one wireless device, the apparatus can determine sensing coverage of the at least one wireless device. The apparatus can further provide the determined sensing coverage and a position of at least one device to a user device.

48 Claims, 15 Drawing Sheets

(51) Int. Cl.
  *H04W 16/20* (2009.01)
  *H04W 24/02* (2009.01)
  *H04W 64/00* (2009.01)

(56) References Cited

U.S. PATENT DOCUMENTS

2017/0246742 A1* 8/2017 Baroudi ............... B25J 9/1664
2020/0166609 A1  5/2020 Trotta et al.
2021/0041548 A1  2/2021 Chen et al.
2022/0327360 A1  10/2022 Merlin et al.

OTHER PUBLICATIONS

International Search Report and Written Opinion—PCT/US2022/018801—ISA/EPO—dated May 24, 2022.

Le D., et al., "SomBe: Self-Organizing Map for Unstructured and Non-Coordinated iBeacon Constellations", 2018 IEEE International Conference on Pervasive Computing and Communications (PERCOM), IEEE, Mar. 19, 2018 (Mar. 19, 2018), pp. 1-10, XP033391425, DOI: 10.1109/PERCOM.2018.8444584 [retrieved on Aug. 22, 2018] Section IV, figures 1-5.

Li X., et al., "Design and Implementation of Indoor Positioning System Based on iBeacon", 2016 International Conference on Audio, Language and Image Processing (ICALIP), IEEE, Jul. 11, 2016 (Jul. 11, 2016), pp. 126-130, XP033061936, DOI: 10.1109/ICALIP.2016.7846648 [retrieved on Feb. 7, 2017] paragraph [02.2]—paragraph [04.2] figures 1-5.

Yang Y., et al., "Using iBeacon for Intelligent in-Room Presence Detection", 2016 IEEE International Multi-Disciplinary Conference on Cognitive Methods in Situation Awareness and Decision Support (COGSIMA), IEEE, Mar. 21, 2016 (Mar. 21, 2016), pp. 187-191, XP032915685, DOI: 10.1109/COGSIMA.2016.7497808 [retrieved on Jun. 22, 2016] Sections I, II and III, p. 1-p. 3, Figures 1,2, 4.

* cited by examiner

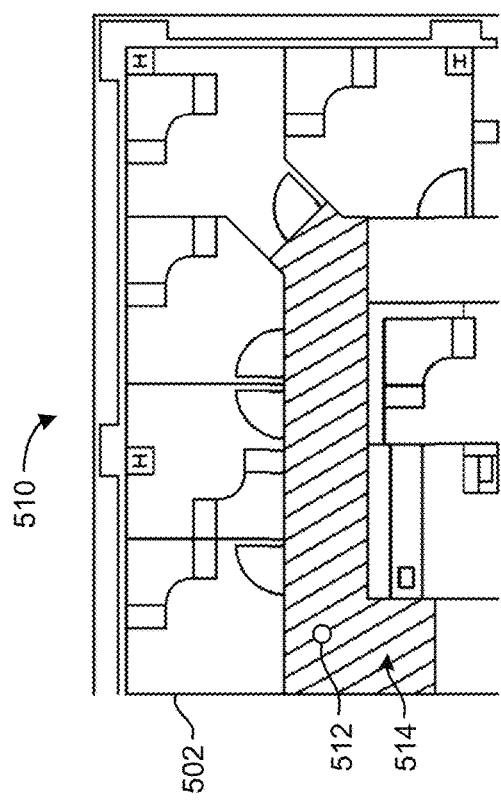
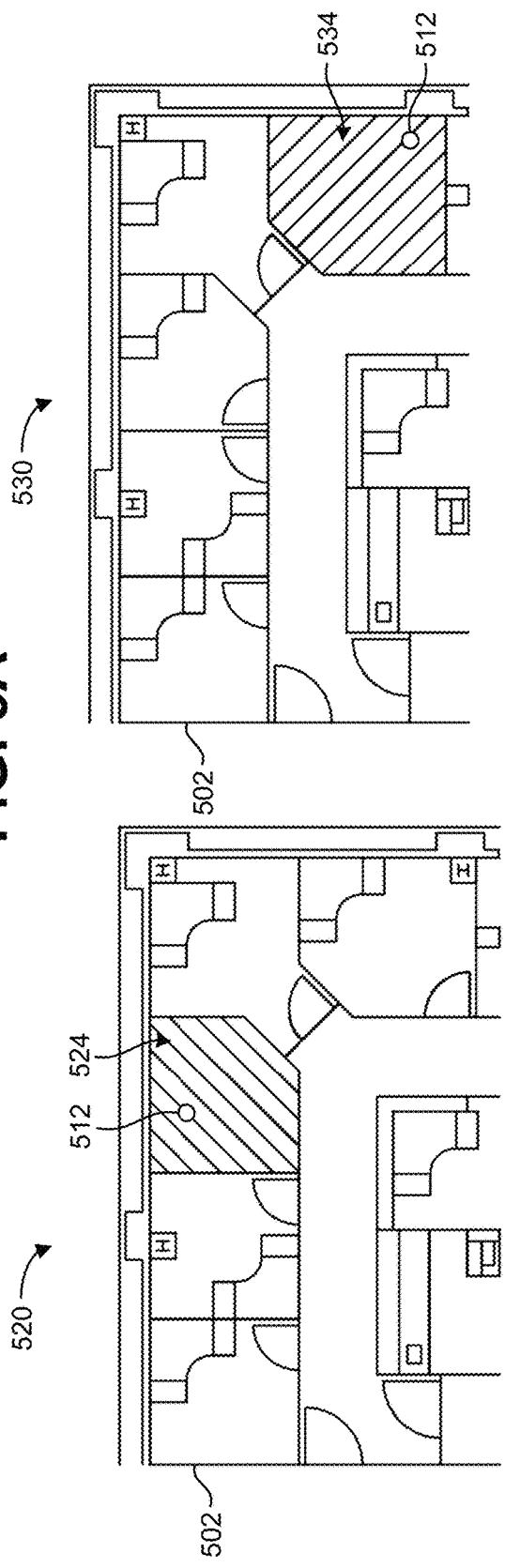

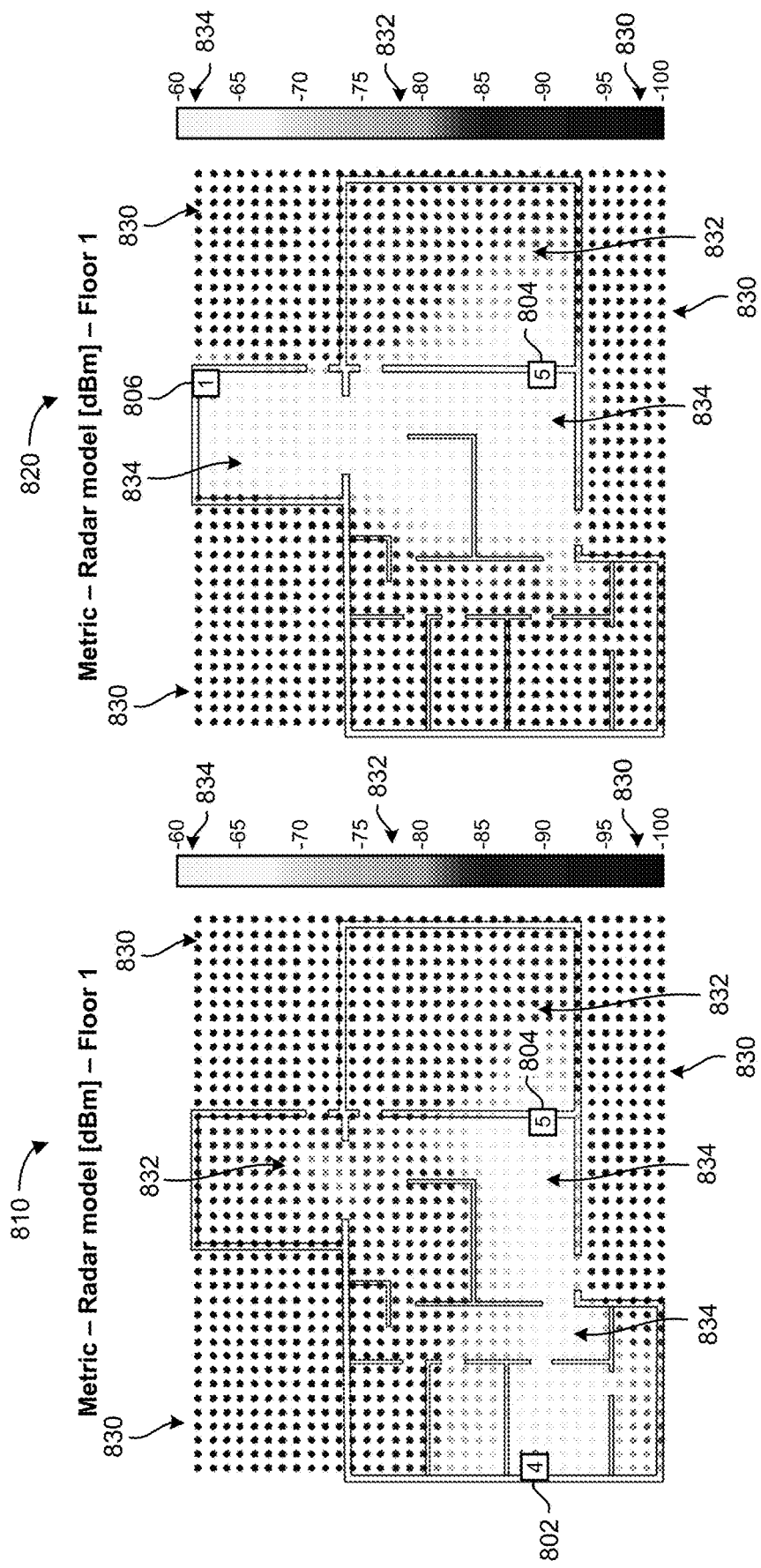

PASSIVE POSITIONING WITH RADIO FREQUENCY SENSING

FIELD OF THE DISCLOSURE

Aspects of the disclosure relate generally to wireless positioning and the like. In some implementations, examples are described for providing passive positioning with radio frequency (RF) sensing.

BACKGROUND OF THE DISCLOSURE

Wireless sensing devices are capable of providing radio frequency features that can be used to detect objects in a given environment. For example, radio frequency sensing devices can include software and hardware components that can be distributed throughout an environment and can be configured to track users moving throughout the environment. In order to implement various telecommunications functions, wireless sensing devices can include hardware and software components that are configured to transmit and receive radio frequency (RF) signals. For example, a wireless device can be configured to communicate via Wi-Fi, 5G/New Radio (NR), Bluetooth™, and/or ultra-wideband (UWB), among others.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods, and computer-readable media for sensing radio frequency signals. According to at least one example, a method is provided for sensing radio frequency signals. The method can include: receiving, by an apparatus, radio frequency data associated with at least one wireless device in an environment; determining sensing coverage of the at least one wireless device based on the radio frequency data, the sensing coverage being associated with detection of one or more objects in the environment; and providing the determined sensing coverage and a position of at least one device.

In another example, an apparatus for sensing radio frequency signals is provided that includes at least one network interface, at least one memory, and at least one processor (e.g., configured in circuitry) coupled to the at the one memory. The at least one processor is configured to: receive, via the at least one network interface, radio frequency data associated with the at least one wireless device in an environment; determine sensing coverage of the at least one wireless device based on the radio frequency data, the sensing coverage being associated with detection of one or more objects in the environment; and provide, via the at least one network interface to a user device, the determined sensing coverage and a position of at least one device.

In another example, a non-transitory computer-readable storage medium of an apparatus is provided that comprises at least one instruction for causing a computer or processor to: receive radio frequency data associated with at least one wireless device in an environment; determine sensing coverage of the at least one wireless device based on the radio frequency data, the sensing coverage being associated with detection of one or more objects in the environment; and provide the determined sensing coverage and a position of at least one device.

In another example, an apparatus for sensing radio frequency signals is provided. The apparatus includes: means for receiving radio frequency data associated with at least one wireless device in an environment; means for determining sensing coverage of the at least one wireless device based on the radio frequency data, the sensing coverage being associated with detection of one or more objects in the environment; and means for providing the determined sensing coverage and a position of at least one device.

In some aspects, the apparatus is or is part of a wireless device, such as mobile device (e.g., a mobile telephone or so-called "smart phone" or other mobile device), a wearable device, an extended reality device (e.g., a virtual reality (VR) device, an augmented reality (AR) device, or a mixed reality (MR) device), a tablet, a personal computer, a laptop computer, a server computer, a wireless access point, a vehicle or component of a vehicle, or other any other device having an RF interface.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIGS. 5A-5C are diagrams illustrating examples of object detection utilizing a distributed sensing system, in accordance with some examples;

FIGS. 8A and 8B are diagrams illustrating examples of heat maps representing sensing coverage provided by a distributed sensing system, in accordance with some examples;

DETAILED DESCRIPTION

Figure 1:
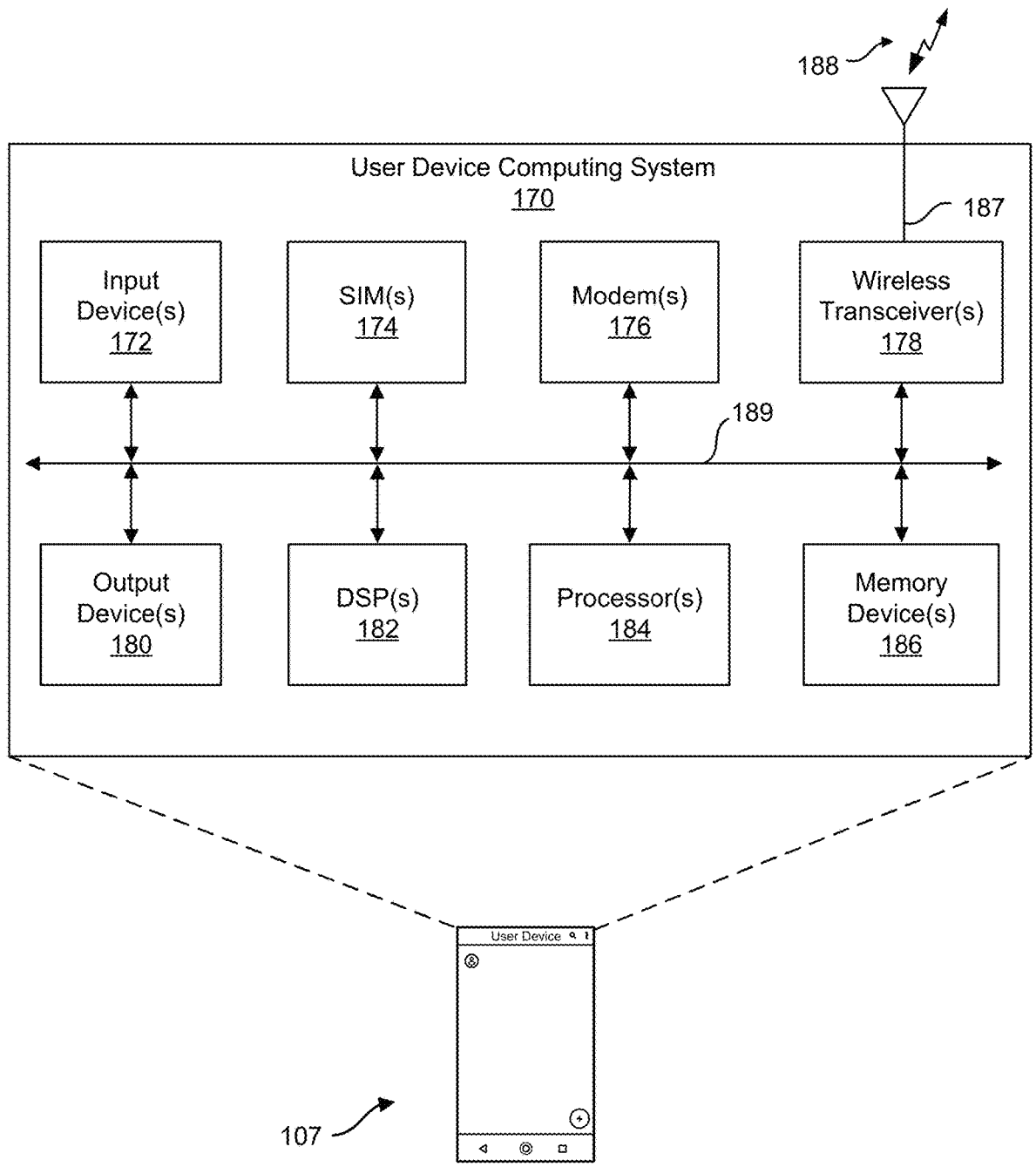
FIG. 1 is a block diagram illustrating an example of a computing system of a user device, in accordance with some examples.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Many sensing devices (e.g., portable electronic devices, smartphones, tablets, laptops, and WiFi mesh Access Points) are capable of performing radio frequency sensing (also referred to as RF sensing). For example, sensing devices can utilize RF sensing techniques to perform object detection (e.g., determining that an intruder has entered the premises). RF sensing has many applications, such as tracking object movement, providing home and business security, among others.

In some examples, radio frequency sensing can utilize signals (e.g., WiFi signals, 3GPP signals, Bluetooth™ signals, etc.) to detect and characterize changes in an environment, such as passive positioning or motion of people and activity characterization. For instance, a radio frequency sensing system, as described herein, can analyze communications associated with wireless devices (e.g., WiFi Access Points or other devices), which can be referred to as sensing devices, to provide accurate detection of one or more moving objects (e.g., a person or other object) in an environment. Examples of sensing detection include detecting motion (e.g., presence of motion or lack of motion or no-motion), motion patterns (e.g., walking, falling, gestures, or other motion), motion location (e.g., a position), motion tracking (e.g., movement of an object or person over time), vital signs of a person or animal (e.g., breathing, heart rate, etc.), any combination thereof, and/or other information), among others. In one illustrative example, positioning of a moving object can be determined in a multi-room environment.

Systems and techniques described herein can enable RF sensing in various environments, such as consumer-level RF sensing in homes. Though illustrative examples are described herein using communications among WiFi devices (e.g., mesh Access Points), other types of radio frequency technologies are contemplated by the present disclosure such as 3GPP (e.g., LTE, 5G, etc.) networks, Bluetooth™, Ultra Wide Band (UWB) communications, and/or other types of wireless communications. For example, the systems and techniques described herein can utilize RF signals transmitted by devices according to the 5G standard. Other types of wireless devices can also be utilized by the radio frequency sensing system, as described herein, that may not be solely focused on communication. Examples include RADAR devices and other sensing designed devices for sensing purposes that can transmit and/or receive the wireless signals for the purpose of providing sensing functionalities to the radio frequency sensing system. The deployment of a radio frequency sensing system can be more effective when set-up of the sensing devices utilized by the radio frequency sensing system is simple and intuitive to a user. The feasibility or accuracy of sensing detections by the radio frequency sensing system can be a function of a position of the various sensing devices (e.g., Access Points). For example, if a user intends to deploy sensing devices at their home for detection purposes (e.g., to detect motion or no-motion, motion patterns, position, motion tracking, vital signs, and/or other characteristic of an object), it would be beneficial for the user to be provided with a simple way to determine whether placement of the sensing devices is appropriate to cover areas of interest. For example, information indicating how to reposition and/or add sensing devices to provide the best coverage for detection purposes (e.g., for positioning and motion detection) would be advantageous to the user.

Systems, apparatuses, processes (also referred to as methods), and computer-readable media (collectively referred to as "systems and techniques") are described herein for performing radio frequency sensing. The systems and techniques enable a user-friendly mechanism for estimating a coverage area of a given deployment of sensing devices for purposes of detection (e.g., positioning, motion detection, etc.). For example, a radio frequency sensing system can measure certain characteristics of propagation relating to communications among radio frequency sensing devices (e.g., relative to an object in question) in an environment. The radio frequency sensing system can provide feedback (e.g., in real time, near real-time, or not in real time) to a device of a user with information indicating how to improve the deployment of the radio frequency sensing devices in the environment. The systems and techniques can be used to perform radio frequency sensing based detection (e.g., positioning, motion detection, vital sign detection, etc.) of any type of objects, such as people, walls, furniture, doors, vehicles, robotic devices (e.g., an autonomous vacuum cleaner), among other objects.

The radio frequency sensing system can be referred to as a distributed sensing system that includes distributed sensing devices throughout an environment. For example, the sensing devices of the distributed sensing system can provide sensing coverage within the environment. The distributed sensing system can analyze radio frequency data, including radio frequency sensing signals that are received by the sensing devices to detect characteristics of an object (e.g., determine the position and/or motion of an object). As used herein, radio frequency data can include RF sensing signals (e.g., waveforms or wireless) signals, such as one or more RF waveforms that are reflected from one or more objects and/or structures in an environment. Additionally radio frequency data can include data (or metadata) pertaining to RF waveforms or signals, such as one or more various measurements that are made based on RF signals communicated between a transmitter and a receiver. By way of example, a distributed sensing system can determine or obtain radio frequency data or RF sensing data (e.g., received signal strength indicators, channel state information (CSI) data, and/or other data) based on the radio frequency sensing signals received by one or more sensing devices. Based on the radio frequency sensing data, the distributed sensing system can determine the sensing coverage of the distributed sensing system. In some aspects, the distributed sensing system can use the radio frequency data to determine various characteristics associated with one or more objects within a coverage area. By way of example, the distributed sensing system can be configured to make determinations about a position, motion, and/or other characteristic of one or more objects within the sensing coverage of the distributed sensing system. In some cases, the sensing operations described herein may utilize machine learning models that are trained to perform the detection based operations (e.g., to detect motion or no-motion, motion patterns, position, motion tracking, vital signs, and/or other characteristic of an object).

As described herein, the distributed sensing system can provide sensing feedback to a user device associated with the user (e.g., a mobile device, a tablet device a wearable device, a laptop or desktop computer, and/or other device). The sensing feedback can be referred to as a sensing coverage. The sensing coverage can include information or instructions relating to the position of one or more existing sensing devices and/or one or more new (to-be-added) sensing devices that can be added to the distributed sensing system. In one illustrative example, as a user walks through a given environment, the distributed sensing system can receive radio frequency sensing data from various radio frequency sensing devices in the general vicinity of the user. For instance, one of the sensing devices in the environment and/or a server (e.g., a cloud server) can receive the radio frequency sensing data. The distributed sensing system (e.g., one of the sensing devices in the environment and/or the server) can then determine whether the position of the one or more existing and/or new sensing devices are at appropriate locations based on sensing or positional data. The distributed sensing system can provide indications such as the need to add a sensing device at a location that extends or increases power output of an area of interest. The distributed sensing system can transmit a sensing coverage to the user device. The sensing coverage can include information or instructions indicating whether and/or how to position the existing or new sensing device(s) throughout the environment. The sensing coverage can be displayed and/or played (e.g., using one or more speakers) by the user device and/or can be displayed and/or played (e.g., using one or more speakers) by one or more of the sensing devices.

In one illustrative example, the sensing coverage can indicate (e.g., via a visual indication on a display or an audible indication via one or more speakers) that "Access point 1 and 2 are too far", that "Access point 1 and 2 are too close", that "In your current position, the detection is weak, move Access Point 2 closer to this area", that "In your current position, we cannot detect your motion, move or add one Access point closer to this area", "Adding a sensing device in 'this' area may improve detection" among other possible outputs. In some cases, if the distributed sensing system determines that an existing or new sensing device is in a suitable or optimal position in the environment, the distributed sensing system can provide a sensing coverage (e.g., via a message, such as text, colored lights, symbols, etc.) to indicate that the sensing device(s) do not need to be modified.

In some aspects, a distributed sensing system can include various processes for estimating a sensing coverage and providing feedback (e.g., sensing coverage) regarding the sensing coverage. For example, one or more signaling protocols (e.g., as illustrated and described in FIGS. 6 and 7) can be used to facilitate the deployment of radio frequency sensing devices of the distributed sensing system based on characteristics (e.g., signal power and gain attributes) of radio frequency signals transmitted by and/or received by one or more of the sensing devices of the distributed sensing system. In one example, the distributed sensing system can measure signal strengths between each pair of sensing devices. If two sensing devices are too far from each other (e.g., include a weak radio frequency signal), it is likely that any sensing detection performed based on those signals will be inaccurate and unusable. If the two sensing devices are too close, then sensing coverage may not be optimized for a predetermined or given floor plan of the environment. Metrics (e.g., including sensing and radio frequency signal information and data) based on initial sensing measurements may provide some necessary, but insufficient conditions, for a good sensing coverage estimate.

In some examples, the distributed sensing system can obtain sensing measurements by utilizing a sensing measuring device (e.g., a mobile phone associated with a user) that is moved throughout the environment by a user or autonomously. The distributed sensing system can measure signal strengths between the sensing measuring device and each of the other sensing devices distributed throughout the environment. By utilizing a sensing measuring device, the distributed sensing system can provide an accurate, zone-dependent estimation. The estimation based on the measuring device measurements may be used to determine a predicted strength of the sensing signal that would be detected by the sensing system's devices. Formulas characterizing the wireless signal propagation may be used for computation by the distributed sensing system. In such cases, the reflectivity of the person or object that is the target, often called radar cross section (RCS), may be approximated or be a configurable parameter. For example, the measuring device can measure the signal strength between the measuring device and one or more sensing devices. This can allow the measurement of two paths including the signal strength between the transmitter and measuring device. Moreover, if the sensing device are access points, the access points can constantly or periodically send beacons, in which case the measuring device that is moving through the environment can continuously or periodically measure the signal strength of the beacons. In some cases, the measuring device can measure channel variations that are induced by the person walking through the environment. By measuring the strength of the respective signal, the distributed sensing system can approximate certain types of errors. For example, the measuring device may solicit the transmission of a reference signal from one or more of the sensing devices, for the purpose of measuring the signal strength or path loss between the measuring device and the sensing device. In another example, one or more of the sensing devices may solicit the transmission of a reference signal from the sensing measuring device for estimating the same quantities.

In another example, the distributed sensing system can measure channel variations induced by a target object (e.g., a person or other object) moving between different locations of interest. For example, the distributed sensing system can initiate a sensing procedure where the distributed sensing system collects channel state information (CSI) measurements from one or more of the sensing links between or amongst the plurality of sensing devices, while the target is moving in the areas of interest. By measuring the channel variations induced by the target object, the distributed sensing system can provide highly relevant metric information that is close to the sensing operation being performed. Sensing devices of the distributed sensing system may also compute the metric information for some or all of the pairs (e.g., sensing links amongst sensing devices) to determine which sensing devices are detecting radio frequency signals sufficient to facilitate radio frequency sensing based detection operations. In some cases, a subset of the sensing devices may be sufficient for the distributed sensing system.

The measurements described above, and the metrics derived therefrom, can be further processed to provide feedback to the user. One example of such processing can include determining whether a certain metric is above or below a threshold. In particular, the metric can utilize signal strength measurements to approximate the signal strength of the actual sensing signal associated with the detection of interest, and compare that with a noise level or a predefined threshold. In one example, the processor can include a function that considers input of one or more metrics and generates an output of the desired feedback. Such a function can include utilizing a trained machine learning model.

As noted above, the systems and techniques provide the ability for the distributed sensing system (e.g., one of the sensing devices in the environment and/or the server) to collect radio frequency sensing data that can be used to perform object recognition, detect motion, determine the presence of a person, determine the orientation and position of the person, and/or perform authentication of the person. In some aspects, the radio frequency sensing data can be collected by utilizing wireless interfaces that are capable of simultaneously performing transmit and receive functions (e.g., a monostatic configuration). In some aspects, the radio frequency sensing data can be collected by utilizing a bistatic configuration in which the transmit and receive functions are performed by different devices (e.g., a first wireless device transmits a radio frequency waveform and a second wireless device receives the radio frequency waveform and any corresponding reflections). Examples will be described herein using Wi-Fi as an illustrative example. However, the systems and techniques are not limited to Wi-Fi. For example, in some cases, the systems and techniques can be implemented using 5G/New Radio (NR), such as using millimeter wave (mmWave) technology. In some cases, the systems and techniques can be implemented using other wireless technologies, such as Bluetooth™, ultra-wideband (UWB), among others.

Various aspects of the systems and techniques described herein will be discussed below with respect to the figures. FIG. 1 illustrates an example of a computing system 170 of a user device 107. The user device 107 is an example of a device that can be used by an end-user. For example, the user device 107 can include a mobile phone, router, tablet computer, laptop computer, tracking device, wearable device (e.g., a smart watch, glasses, an XR device, etc.), Internet of Things (IoT) device, a vehicle (or a computing device of a vehicle), and/or another device used by a user to communicate over a wireless communications network. In some cases, the device can be referred to as a station (STA), such as when referring to a device configured to communicate using the Wi-Fi standard. In some cases, the device can be referred to as user equipment (UE), such as when referring to a device configured to communicate using 5G/New Radio (NR), Long-Term Evolution (LTE), or other telecommunication standard.

The computing system 170 includes software and hardware components that can be electrically or communicatively coupled via a bus 189 (or may otherwise be in communication, as appropriate). For example, the computing system 170 includes one or more processors 184. The one or more processors 184 can include one or more CPUs, ASICs, FPGAs, APs, GPUs, VPUs, NSPs, microcontrollers, dedicated hardware, any combination thereof, and/or other processing device/s and/or system/s. The bus 189 can be used by the one or more processors 184 to communicate between cores and/or with the one or more memory devices 186.

The computing system 170 may also include one or more memory devices 186, one or more digital signal processors (DSPs) 182, one or more subscriber identity modules (SIMs) 174, one or more modems 176, one or more wireless transceivers 178, one or more antennas 187, one or more input devices 172 (e.g., a camera, a mouse, a keyboard, a touch sensitive screen, a touch pad, a keypad, a microphone, and/or the like), and one or more output devices 180 (e.g., a display, a speaker, a printer, and/or the like).

The one or more wireless transceivers 178 can receive wireless signals (e.g., signal 188) via antenna 187 from one or more other devices, such as other user devices, network devices (e.g., base stations such as eNBs and/or gNBs, Wi-Fi access points (APs) such as routers, range extenders or the like, etc.), cloud networks, and/or the like. In some examples, the computing system 170 can include multiple antennas or an antenna array that can facilitate simultaneous transmit and receive functionality. Antenna 187 can be an omnidirectional antenna such that RF signals can be received from and transmitted in all directions. The wireless signal 188 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network. In some examples, the one or more wireless transceivers 178 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 188 into a baseband or intermediate frequency and can convert the RF signals to the digital domain.

In some cases, the computing system 170 can include a coding-decoding device (or CODEC) configured to encode and/or decode data transmitted and/or received using the one or more wireless transceivers 178. In some cases, the computing system 170 can include an encryption-decryption device or component configured to encrypt and/or decrypt data (e.g., according to the Advanced Encryption Standard (AES) and/or Data Encryption Standard (DES) standard) transmitted and/or received by the one or more wireless transceivers 178.

The one or more SIMs 174 can each securely store an international mobile subscriber identity (IMSI) number and related key assigned to the user of the user device 107. The IMSI and key can be used to identify and authenticate the subscriber when accessing a network provided by a network service provider or operator associated with the one or more SIMs 174. The one or more modems 176 can modulate one or more signals to encode information for transmission using the one or more wireless transceivers 178. The one or more modems 176 can also demodulate signals received by the one or more wireless transceivers 178 in order to decode the transmitted information. In some examples, the one or more modems 176 can include a Wi-Fi modem, a 4G (or LTE) modem, a 5G (or NR) modem, and/or other types of modems. The one or more modems 176 and the one or more wireless transceivers 178 can be used for communicating data for the one or more SIMs 174.

The computing system 170 can also include (and/or be in communication with) one or more non-transitory machine-readable storage media or storage devices (e.g., one or more memory devices 186), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 186 and executed by the one or more processor(s) 184 and/or the one or more DSPs 182. The computing system 170 can also include software elements (e.g., located within the one or more memory devices 186), including, for example, an operating system, device drivers, executable libraries, and/or other code, such as one or more application programs, which may comprise computer programs implementing the functions provided by various embodiments, and/or may be designed to implement methods and/or configure systems, as described herein.

Figure 2:
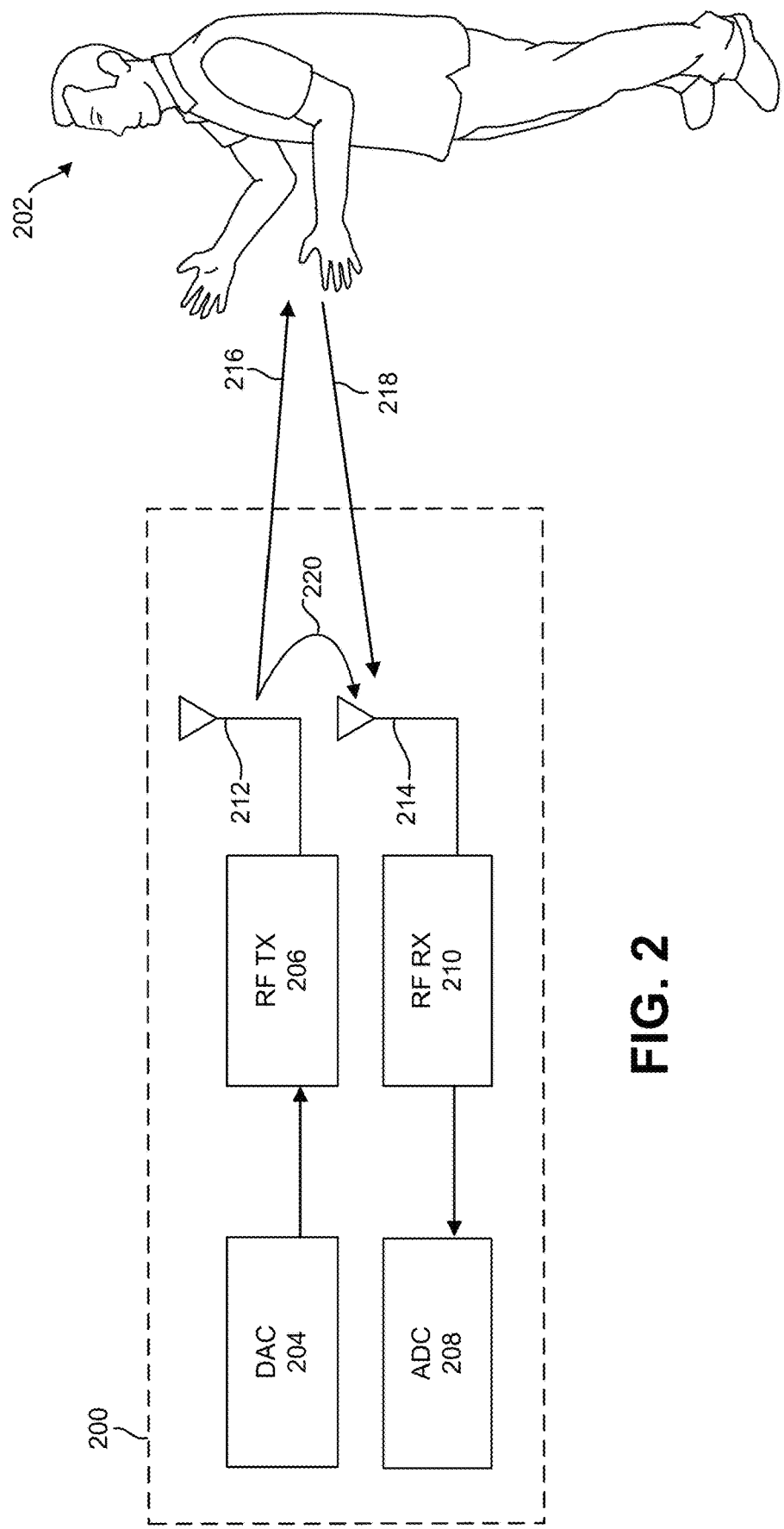
FIG. 2 is a diagram illustrating an example of a wireless device utilizing radio frequency (RF) sensing techniques to detect user presence and perform facial recognition, in accordance with some examples.

FIG. 2 is a diagram illustrating an example of a wireless device 200 that utilizes RF sensing techniques to perform one or more functions, such as detecting a presence of a user 202, detecting orientation characteristics of the user, performing motion detection, any combination thereof, and/or perform other functions. In some examples, the wireless device 200 can be the user device 107, such as a mobile phone, a tablet computer, a wearable device, or other device that includes at least one RF interface. In some examples, the wireless device 200 can be a device that provides connectivity for a user device (e.g., for user device 107), such as a wireless access point (AP), a base station (e.g., a gNB, eNB, etc.), or other device that includes at least one RF interface.

In some aspects, wireless device 200 can include one or more components for transmitting an RF signal. Wireless device 200 can include a digital-to-analog converter (DAC) 204 that is capable of receiving a digital signal or waveform (e.g., from a microprocessor, not illustrated) and converting the signal or waveform to an analog waveform. The analog signal that is the output of DAC 204 can be provided to RF transmitter 206. The RF transmitter 206 can be a Wi-Fi transmitter, a 5G/NR transmitter, a Bluetooth™ transmitter, or any other transmitter capable of transmitting an RF signal.

RF transmitter 206 can be coupled to one or more transmitting antennas such as TX antenna 212. In some examples, TX antenna 212 can be an omnidirectional antenna that is capable of transmitting an RF signal in all directions. For example, TX antenna 212 can be an omni-directional Wi-Fi antenna that can radiate Wi-Fi signals (e.g., 2.4 GHz, 5 GHz, 6 GHz, etc.) in a 360-degree radiation pattern. In another example, TX antenna 212 can be a directional antenna that transmits an RF signal in a particular direction.

In some examples, wireless device 200 can also include one or more components for receiving an RF signal. For example, the receiver lineup in wireless device 200 can include one or more receiving antennas such as RX antenna 214. In some examples, RX antenna 214 can be an omni-directional antenna capable of receiving RF signals from multiple directions. In other examples, RX antenna 214 can be a directional antenna that is configured to receive signals from a particular direction. In further examples, both TX antenna 212 and RX antenna 214 can include multiple antennas (e.g., elements) configured as an antenna array.

Wireless device 200 can also include an RF receiver 210 that is coupled to RX antenna 214. RF receiver 210 can include one or more hardware components for receiving an RF waveform such as a Wi-Fi signal, a Bluetooth™ signal, a 5G/NR signal, or any other RF signal. The output of RF receiver 210 can be coupled to an analog-to-digital converter (ADC) 208. ADC 208 can be configured to convert the received analog RF waveform into a digital waveform that can be provided to a processor such as a digital signal processor (not illustrated).

In one example, wireless device 200 can implement RF sensing techniques by causing TX waveform 216 to be transmitted from TX antenna 212. Although TX waveform 216 is illustrated as a single line, in some cases, TX waveform 216 can be transmitted in all directions by an omnidirectional TX antenna 212. In one example, TX waveform 216 can be a Wi-Fi waveform that is transmitted by a Wi-Fi transmitter in wireless device 200. In some cases, TX waveform 216 can correspond to a Wi-Fi waveform that is transmitted at or near the same time as a Wi-Fi data communication signal or a Wi-Fi control function signal (e.g., a beacon transmission). In some examples, TX waveform 216 can be transmitted using the same or a similar frequency resource as a Wi-Fi data communication signal or a Wi-Fi control function signal (e.g., a beacon transmission). In some aspects, TX waveform 216 can correspond to a Wi-Fi waveform that is transmitted separately from a Wi-Fi data communication signal and/or a Wi-Fi control signal (e.g., TX waveform 216 can be transmitted at different times and/or using a different frequency resource).

In some examples, TX waveform 216 can correspond to a 5G NR waveform that is transmitted at or near the same time as a 5G NR data communication signal or a 5G NR control function signal. In some examples, TX waveform 216 can be transmitted using the same or a similar frequency resource as a 5G NR data communication signal or a 5G NR control function signal. In some aspects, TX waveform 216 can correspond to a 5G NR waveform that is transmitted separately from a 5G NR data communication signal and/or a 5G NR control signal (e.g., TX waveform 216 can be transmitted at different times and/or using a different frequency resource).

In some aspects, one or more parameters associated with TX waveform 216 can be modified that may be used to increase or decrease RF sensing resolution. The parameters may include frequency, bandwidth, number of spatial streams, the number of antennas configured to transmit TX waveform 216, the number of antennas configured to receive a reflected RF signal corresponding to TX waveform 216, the number of spatial links (e.g., number of spatial streams multiplied by number of antennas configured to receive an RF signal), the sampling rate, or any combination thereof.

In further examples, TX waveform 216 can be implemented to have a sequence that has perfect or almost perfect autocorrelation properties. For instance, TX waveform 216 can include single carrier Zadoff sequences or can include symbols that are similar to orthogonal frequency-division multiplexing (OFDM) Long Training Field (LTF) symbols. In some cases, TX waveform 216 can include a chirp signal, as used, for example, in a Frequency-Modulated Continuous-Wave (FM-CW) radar system. In some configurations, the chirp signal can include a signal in which the signal frequency increases and/or decreases periodically in a linear and/or an exponential manner.

In some aspects, wireless device 200 can further implement RF sensing techniques by performing concurrent transmit and receive functions. For example, wireless device 200 can enable its RF receiver 210 to receive at or near the same time as it enables RF transmitter 206 to transmit TX waveform 216. In some examples, transmission of a sequence or pattern that is included in TX waveform 216 can be repeated continuously such that the sequence is transmitted a certain number of times or for a certain duration of time. In some examples, repeating a pattern in the transmission of TX waveform 216 can be used to avoid missing the reception of any reflected signals if RF receiver 210 is enabled after RF transmitter 206. In one example implementation, TX waveform 216 can include a sequence having a sequence length L that is transmitted two or more times, which can allow RF receiver 210 to be enabled at a time less than or equal to L in order to receive reflections corresponding to the entire sequence without missing any information.

By implementing simultaneous transmit and receive functionality, wireless device 200 can receive any signals that correspond to TX waveform 216. For example, wireless device 200 can receive signals that are reflected from objects or people that are within range of TX waveform 216, such as RX waveform 218 reflected from user 202. Wireless device 200 can also receive leakage signals (e.g., TX leakage signal 220) that are coupled directly from TX antenna 212 to RX antenna 214 without reflecting from any objects. For example, leakage signals can include signals that are transferred from a transmitter antenna (e.g., TX antenna 212) on a wireless device to a receive antenna (e.g., RX antenna 214) on the wireless device without reflecting from any objects. In some cases, RX waveform 218 can include multiple sequences that correspond to multiple copies of a sequence that are included in TX waveform 216. In some examples, wireless device 200 can combine the multiple sequences that are received by RF receiver 210 to improve the signal to noise ratio (SNR).

Wireless device 200 can further implement RF sensing techniques by obtaining RF sensing data associated with each of the received signals corresponding to TX waveform 216. In some examples, the RF sensing data can include channel state information (CSI) data relating to the direct paths (e.g., leakage signal 220) of TX waveform 216 together with data relating to the reflected paths (e.g., RX waveform 218) that correspond to TX waveform 216.

In some aspects, RF sensing data (e.g., CSI data) can include information that can be used to determine the manner in which an RF signal (e.g., TX waveform 216) propagates from RF transmitter 206 to RF receiver 210. RF sensing data can include data that corresponds to the effects on the transmitted RF signal due to scattering, fading, and/or power decay with distance, or any combination thereof. In some examples, RF sensing data can include imaginary data and real data (e.g., I/Q components) corresponding to each tone in the frequency domain over a particular bandwidth.

In some examples, RF sensing data can be used to calculate distances and angles of arrival that correspond to reflected waveforms, such as RX waveform 218. In further examples, RF sensing data can also be used to detect motion, determine location, detect changes in location or motion patterns, obtain channel estimation, or any combination thereof. In some cases, the distance and angle of arrival of the reflected signals can be used to identify the size, position, movement, or orientation of users in the surrounding environment (e.g., user 202) in order to detect object presence/proximity, detect object attention, and/or perform motion detection.

Wireless device 200 can calculate distances and angles of arrival corresponding to reflected waveforms (e.g., the distance and angle of arrival corresponding to RX waveform 218) by utilizing signal processing, machine learning algorithms, using any other suitable technique, or any combination thereof. In other examples, wireless device 200 can send the RF sensing data to another computing device, such as a server, that can perform the calculations to obtain the distance and angle of arrival corresponding to RX waveform 218 or other reflected waveforms.

In one example, the distance of RX waveform 218 can be calculated by measuring the difference in time from reception of the leakage signal to the reception of the reflected signals. For example, wireless device 200 can determine a baseline distance of zero that is based on the difference from the time the wireless device 200 transmits TX waveform 216 to the time it receives leakage signal 220 (e.g., propagation delay). Wireless device 200 can then determine a distance associated with RX waveform 218 based on the difference from the time the wireless device 200 transmits TX waveform 216 to the time it receives RX waveform 218 (e.g., time of flight), which can then be adjusted according to the propagation delay associated with leakage signal 220. In doing so, wireless device 200 can determine the distance traveled by RX waveform 218 which can be used to determine the presence and movement of a user (e.g., user 202) that caused the reflection.

In further examples, the angle of arrival of RX waveform 218 can be calculated by measuring the time difference of arrival of RX waveform 218 between individual elements of a receive antenna array, such as antenna 214. In some examples, the time difference of arrival can be calculated by measuring the difference in received phase at each element in the receive antenna array.

In some cases, the distance and the angle of arrival of RX waveform 218 can be used to determine the distance between wireless device 200 and user 202 as well as the position of user 202 relative to wireless device 200. The distance and the angle of arrival of RX waveform 218 can also be used to determine presence, movement, proximity, attention, identity, or any combination thereof, of user 202. For example, wireless device 200 can utilize the calculated distance and angle of arrival corresponding to RX waveform 218 to determine that user 202 is walking towards wireless device 200. Based on the proximity of user 202 to wireless device 200, wireless device 200 can activate facial authentication in order to unlock the device. In some aspects, facial authentication can be activated based upon user 202 being within a threshold distance of wireless device 200. Examples of threshold distances can include 2 feet, 1 foot, 6 inches, 3 inches, or any other distance.

As noted above, wireless device 200 can include mobile devices (e.g., smartphones, laptops, tablets, access points, etc.) or other types of devices. In some examples, wireless device 200 can be configured to obtain device location data and device orientation data together with the RF sensing data. In some instances, device location data and device orientation data can be used to determine or adjust the distance and angle of arrival of a reflected signal such as RX waveform 218. For example, wireless device 200 may be set on a table facing the ceiling as user 202 walks towards it during the RF sensing process. In this instance, wireless device 200 can use its location data and orientation data together with the RF sensing data to determine the direction that the user 202 is walking.

In some examples, device position data can be gathered by wireless device 200 using techniques that include round trip time (RTT) measurements, passive positioning, angle of arrival, received signal strength indicator (RSSI), CSI data, using any other suitable technique, or any combination thereof. In further examples, device orientation data can be obtained from electronic sensors on the wireless device 200, such as a gyroscope, an accelerometer, a compass, a magnetometer, a barometer, any other suitable sensor, or any combination thereof.

Figure 3:
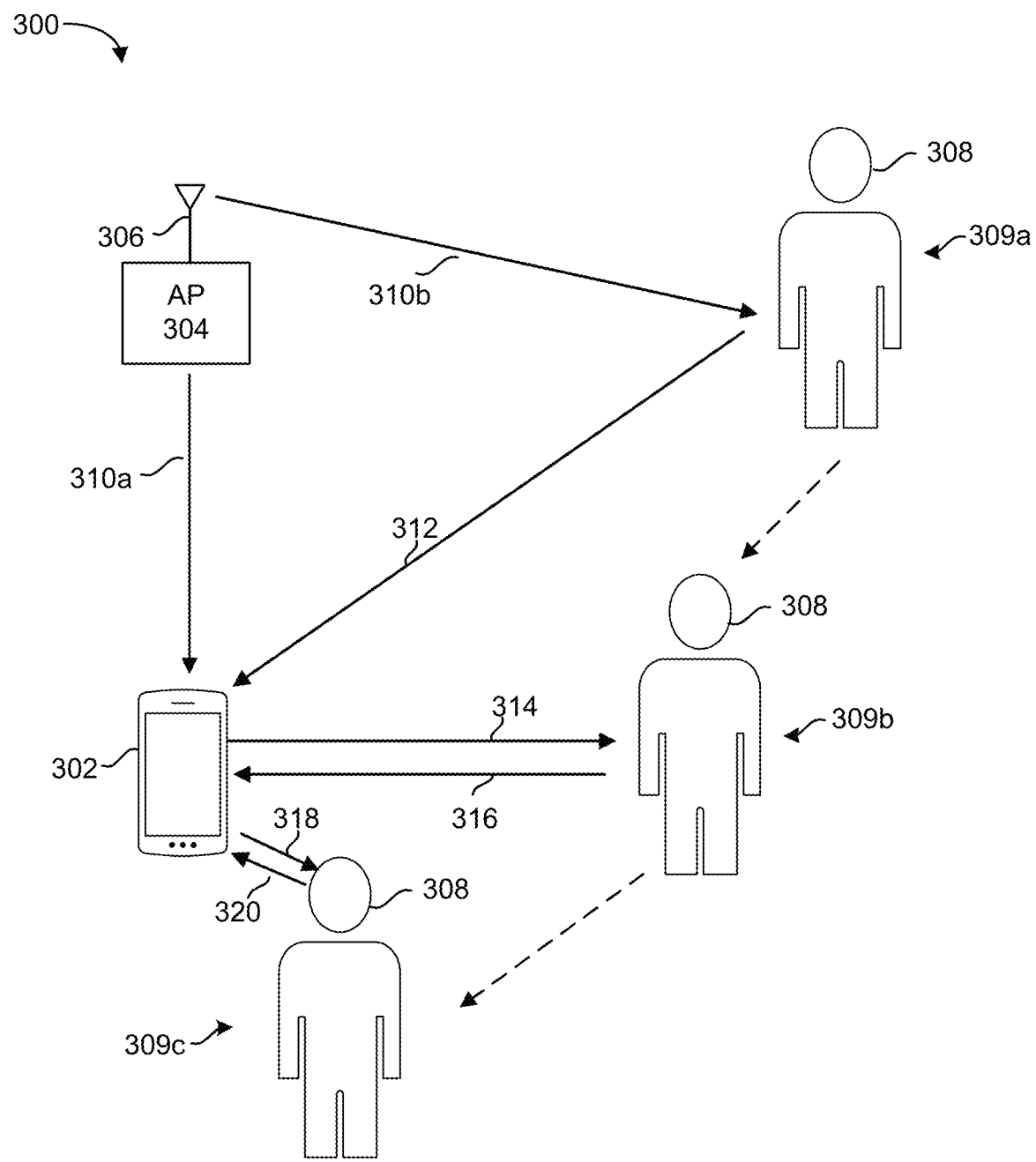
FIG. 3 is a diagram illustrating an example of an environment including wireless devices for detecting user presence and performing facial recognition, in accordance with some examples.

FIG. 3 is a diagram illustrating an environment 300 that includes a wireless device 302, an access point (AP) 304, and a user 308. The wireless device 302 can include a user device (e.g., user device 107 of FIG. 1, such as a mobile device or any other type of device). The AP 304 can also be referred to as a sensing device, a radio frequency sensing device, or a wireless device in some examples. As shown, the user 308 can move to different positions (e.g., with the wireless device 302), including a first user position 309a, a second user position 309b, and a third user position 309c. In some aspects, the wireless device 302 and AP 304 can each be configured to perform RF sensing in order to detect a presence of the user 308, detect movement of the user 308, any combination thereof, and/or perform other functions with respect to the user 308.

In some aspects, AP 304 can be a Wi-Fi access point that includes hardware and software components that can be configured to simultaneously transmit and receive RF signals, such as the components described herein with respect to the wireless device 200 of FIG. 2. For example, AP 304 can include one or more antennas that can be configured to transmit an RF signal and one or more antennas that can be configured to receive an RF signal (e.g., antenna 306). As noted with respect to the wireless device 200 of FIG. 2, AP 304 can include omnidirectional antennas or antenna arrays that are configured to transmit and receive signals from any direction.

In some aspects, the AP 304 and the wireless device 302 can be configured to implement a bistatic configuration in which the transmit and receive functions are performed by different devices. For example, AP 304 can transmit an omnidirectional RF signal that can include signal 310a and signal 310b. As illustrated, signal 310a can travel directly (e.g., no reflections) from AP 304 to wireless device 302 and signal 310b can reflect off of user 308 at position 309a and cause a corresponding reflected signal 312 to be received by wireless device 302.

In some examples, wireless device 302 can utilize RF sensing data associated with signal 310a and signal 310b to determine presence, location, orientation, and/or movement of user 308 at position 309a. For instance, wireless device 302 can obtain, retrieve, and/or estimate location data associated with AP 304. In some aspects, wireless device 302 can use location data associated with AP 304 and RF sensing data (e.g., CSI data) to determine the time of flight, distance, and/or the angle of arrival associated signals transmitted by AP 304 (e.g., direct path signals such as signal 310a and reflected path signals such as signal 312). In some cases, AP 304 and wireless device 302 can further send and/or receive communication that can include data associated with RF signal 310a and/or reflected signal 312 (e.g., transmission time, sequence/pattern, time of arrival, angle of arrival, etc.).

In some examples, the wireless device 302 can be configured to perform RF sensing using a monostatic configuration, in which case the wireless device 302 performs both the transmit and receive functions (e.g., simultaneous TX/RX discussed in connection with wireless device 200). For instance, wireless device 302 can detect a presence or movement of user 308 at position 309b by transmitting RF signal 314, which can cause a reflected signal 316 from user 308 at position 309b to be received by wireless device 302.

In some aspects, wireless device 302 can obtain RF sensing data associated with reflected signal 316. For example, RF sensing data can include CSI data corresponding to reflected signal 316. In further aspects, wireless device 302 can use the RF sensing data to calculate a distance and an angle of arrival corresponding to reflected signal 316. For instance, wireless device 302 can determine distance by calculating a time of flight for reflected signal 316 based on the difference between a leakage signal (not illustrated) and reflected signal 316. In further examples, wireless device 302 can determine an angle of arrival by utilizing an antenna array to receive the reflected signals and measuring the difference in received phase at each element of the antenna array.

In some examples, wireless device 302 can obtain RF sensing data in the form of CSI data that can be used to formulate a matrix that is based on the number of frequencies represented as 'K' (e.g., tones) and the number of antenna array elements represented as 'N'. In one technique, the CSI matrix can be formulated according to the relationship given by equation (1):

$$\text{CSI Matrix: } H=[h_{ik}], i=1, \ldots, N, k=1, \ldots, K \quad (1)$$

Upon formulating the CSI matrix, wireless device 302 can calculate the angle of arrival and time of flight for direct signal paths (e.g., leakage signals), as well as reflected signal paths (e.g., reflected signal 316) by utilizing a Two-Dimensional Fourier transform. In one example, a Fourier transform can be defined by the relationship given by equation (2) below, in which K corresponds to a number of tones in the frequency domain; N corresponds to a number of receive antennas; $h_{ik}$ corresponds to CSI data captured on the ith antenna and kth tone (e.g., a complex number having a real and an imaginary component); $f_0$ corresponds to a carrier frequency; l corresponds to an antenna spacing; c corresponds to the speed of light; and $\Delta f$ corresponds to a frequency spacing between two adjacent tones. The relationship of equation (2) is provided as follows:

$$F(\theta, d) = \sum_{i=1}^{N}\sum_{i=1}^{K} h_{ik} e^{j\frac{2\pi f_0 i l \sin\theta}{c}} e^{j\frac{2\pi d k \Delta f}{c}} \quad (2)$$

In some aspects, leakage signals (e.g., leakage signal 220 and/or other leakage signals) can be cancelled by using an iterative cancellation method.

In some cases, wireless device 302 can utilize the distance and an angle of arrival corresponding to reflected signal 316 to detect a presence or movement of user 308 at position 309*b*. In other examples, wireless device 302 can detect further movement of the user 308 to a third position 309*c*. Wireless device 302 can transmit RF signal 318 that causes reflected signal 320 from user 308 at position 309*c*. Based on the RF sensing data associated with reflected signal 320, wireless device 302 can determine the presence of user 308 at position 309*c*, detect the user's head presence and/or orientation, and perform facial recognition as well as facial authentication.

In some implementations, wireless device 302 may utilize artificial intelligence or machine learning algorithms to perform motion detection, object classification, and/or detect head orientation relating to user 308. In some examples, the machine learning techniques can include supervised machine learning techniques such as those that utilize neural networks, linear and logistics regression, classification trees, support vector machine, any other suitable supervised machine learning technique, or any combination thereof. For instance, a dataset of sample RF sensing data can be selected for training of the machine learning algorithms or artificial intelligence.

In some aspects, wireless device 302 and AP 304 can perform RF sensing techniques irrespective of their association with each other or with a Wi-Fi network. For example, wireless device 302 can utilize its Wi-Fi transmitter and Wi-Fi receiver to perform RF sensing as discussed herein when it is not associated with any access point or Wi-Fi network. In further examples, AP 304 can perform RF sensing techniques regardless of whether it has any wireless devices associated with it.

The deployment of a radio frequency sensing system can be more effective and efficient when set-up of the radio frequency sensing system is simple and intuitive to a user. The feasibility or accuracy of sensing detections by the radio frequency sensing system can be a function of a position of the various sensing devices (e.g., Access Points) of the radio frequency sensing system. For example, if a user intends to deploy sensing devices at their home for positioning purposes, the user may need to be provided with a simple way to determine whether placement of the sensing devices is appropriate to cover areas of interest and also how to reposition the sensing devices and/or add new sensing devices to provide the best coverage for radio frequency sensing based detection (e.g., positioning, motion detection, vital sign detection, etc.) of objects.

Figure 4:
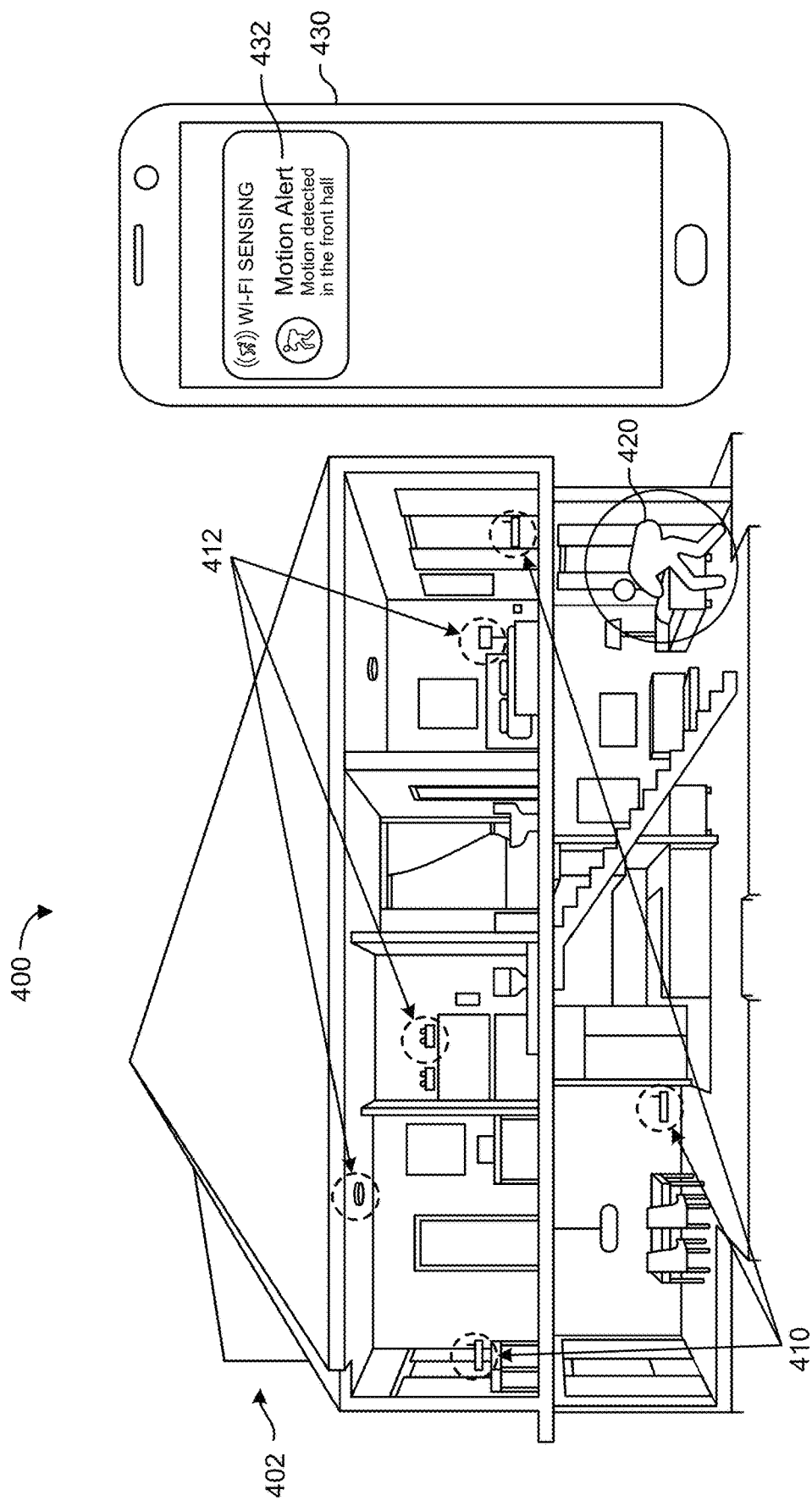
FIG. 4 is a diagram illustrating an example of a distributed sensing system, in accordance with some examples.

FIG. 4 is a diagram illustrating an example of a distributed sensing system 400 that can include a plurality of sensing devices, such as access points 410 and wireless devices 412. The distributed sensing system 400 can perform various radio frequency sensing based detections (e.g., detecting the presence of motion or lack of motion, detecting motion patterns such as walking, falling, gestures, or other motion, detection position of one or more objects, performing motion tracking of an object or person over time, detecting vital signs of a person or animal, any combination thereof, and/or other detections) based on radio frequency signals received by the sensing devices. The radio frequency sensing signals received by a sensing device can include signals received directly from one or more of the other sensing devices and/or can include signals reflected off of one or more objects (e.g., people, animals, furniture) and/or structures (e.g., walls, ceilings, columns, etc.) in the environment.

The wireless devices 412 can include user devices (e.g., user device 107 of FIG. 1, such as a mobile device or any other type of device), Internet of Things (IoT) devices, extenders, replicators, any combination thereof, and/or any other wireless device. The access points 410 can operate as radio frequency sensing devices, Wi-Fi sensing enabled access points, and wireless devices utilizing at least one transceiver (or separate transmitter and receiver), as described herein. The access points 410 and the wireless devices 412 can be distributed throughout an environment to provide a distributed range of sensing coverage for the distributed sensing system 400 to use for performing the radio frequency sensing based detection operations noted above. For example, as shown in FIG. 4, the access points 410 are positioned on both floors and ends of dwelling 402, while the wireless devices 412 are positioned only on the second floor. The placement and position of the access points 410 and the wireless devices 412 determine the coverage of the distributed sensing system 400, which can be repositioned to provide optimal sensing coverage as described herein.

The distributed sensing system 400 is illustrated in FIG. 4 as being positioned within the dwelling 402. However, the systems and techniques described herein can be used for any environment, including indoor and outdoor environments (e.g., a commercial building, a military facility, an indoor or outdoor shopping facility, an outdoor park, an outdoor concert venue, etc.). As illustrated in FIG. 4, the distributed sensing system 400 can detect objects, such as an intruder 420. In some implementations, when the intruder 420 enters the dwelling 402, the distributed sensing system 400 can detect an unidentified/unauthorized object (e.g., the intruder 420) and then begin tracking the position of the intruder 420 throughout the dwelling 402. In other implementations, distributed sensing system 400 can provide an alert (e.g., to authorities such as the police or a home defense company, to a user device of a person associated with the dwelling, etc.) of the detected intruder's 420 presence. Based on the data received from the sensing devices (e.g., access points 410 and/or wireless devices 412), the distributed sensing system 400 can also determine when the object is an intruder, pet, authorized personnel, etc.

In some implementations, the distributed sensing system 400 can detect and characterize changes in an environment by utilizing radio frequency signals such as Wi-Fi signals. In general, radio frequency signals are reflected by objects (e.g., walls, columns, furniture, animals, etc.) and/or people located in the dwelling 402. Data relating to radio frequency reflections includes amplitude and phase change of the radio frequency signals when objects/people move about a given space. The distributed sensing system 400 can be configured to detect motion (e.g., presence of motion or lack of motion or no-motion), motion patterns (e.g., walking, falling, gestures, or other motion), motion location (e.g., a position), motion tracking (e.g., movement of an object or person over time), vital signs of a person or animal (e.g., breathing, heart rate, etc.), any combination thereof, and/or other information. As shown in FIG. 4, the distributed sensing system 400 can provide motion detection and room-level positioning in a dwelling 402.

Algorithms, as described herein, can be utilized by the distributed sensing system 400 to detect motion, location of motion, and types of motion. In some implementations, the distributed sensing system 400 can utilize machine learning (e.g., using a machine learning system such as those described and illustrated in FIGS. 12 and 13) and detection algorithms that can be trained to detect a desired feature such as position, motion, location of motion, or type of motion. The distributed sensing system 400 can be utilized to provide a process for training that includes generating a large number of test data and associating ground truth labels to each data point. In the radio frequency sensing context, the data can be represented by the collected radio frequency channel signatures, and the labels can include location of motion and type of motion, per each data point. Labelling can include either a manual input or a detection system that provides the ground truth (e.g., use of a camera system along with computer vision algorithms).

Referring to FIG. 4, the distributed sensing system 400 can further include providing a wireless device (e.g., mobile device 430) of a user with one or more messages or alerts (e.g., a motion alert 432) including motion detection and motion location information. In FIG. 4, the intruder 420 is detected by the distributed sensing system 400, which can then provide the motion alert 432 to the user's mobile device 430. Such alerts can include an icon representing the alert (e.g., an icon of an intruder) and a brief description of the alert 432 (e.g., "Motion detected in the front hall"). The distributed sensing system 400 can further provide sensing coverage data including information (e.g., indications, instructions, descriptions, etc.) to the wireless device (e.g., the mobile device 430) of the user. The sensing coverage data can provide information associated with placement and/or addition of sensing devices (e.g., the access points 410 and/or wireless devices 412) to provide the most optimum sensing coverage in a given environment. For example, unlike typical network coverage (e.g., Wi-Fi coverage provided by one or more Wi-FI Access Points) that does not take into account the ability to provide sensing data that can be used for radio frequency sensing based detection operations, the distributed sensing system 400 can receive sensing data (e.g., RSSI/CSI data) from the sensing devices (e.g., the access points 410 and/or wireless devices 412) and can determine whether a particular sensing device is at a location that optimizes sensing coverage of the distributed sensing system 400. In one example, by moving an existing sensing device and/or adding a new sensing device, the sensing coverage of the distributed sensing system 400 can be expanded. An additional sensing device (e.g., sensing device 410 and/or sensing device 412) can further boost transmission power and gains experienced by the distributed sensing system 400, which can increase the ability of the distributed sensing system 400 to perform the radio frequency sensing based detection operations noted above (e.g., to detect the position and/or motion of a target object).

In some implementations, the distributed sensing system 400 can utilize RF signals to determine characteristics (e.g., position and movement) of objects detected within the dwelling 402. For example, the RF signals can first be transmitted by a sensing device (e.g., one of the access points 410 and/or wireless devices 412) or one transmitting antenna of a sensing device. The RF signals then can be received at another sensing device (e.g., another one of the access points 410 and/or wireless devices 412) or a receiving antenna of the sensing device depending on the configuration of the distributed sensing system 400. The distributed sensing system 400 can further determine how the environment within the dwelling 402 affects the propagation of the RF signals based on the RSSI/CSI data received from the sensing devices (e.g., the access points 410 and/or wireless devices 412). The distributed sensing system 400 can also determine detections and interferences based on the propagation of the RF signals experienced by the sensing devices.

The distributed sensing system 400 can include many different applications. The example of FIG. 4 illustrates an example of using the distributed sensing system 400 for detection of objects or people, such as for home security purposes. As shown, the distributed sensing system of FIG. 4 includes multiple wireless devices 410, 412 in the dwelling 402 that are part of a sensor network of the distributed sensing system 400. The sensing devices (e.g., the access points 410 and/or wireless devices 412) are configured to provide sensing measurements that can be utilized by the distributed sensing system 400 to detect characteristics of objects, such as the presence of and/or motion of the intruder 420. For instance, the distributed sensing system 400 can detect movement of an object from location to location in the dwelling 402, and specific characteristics of the movement of the object such as speed and direction. The distributed sensing system 400 further collects a large amount of sensing data from the sensing devices, such as RSSI data, CSI data, and/or other data. By utilizing machine learning, the distributed sensing system 400 can analyze object detections based on the collected sensing measurement data (e.g., RSSI/CSI data) from the sensing devices.

FIGS. 5A-5C are diagrams 510, 520, 530 illustrating examples of object detection utilizing a distributed sensing system. FIGS. 5A-5C can further illustrate motion detection and positioning across a building 502. For example, in diagram 510 of FIG. 5A, an object 512 (e.g., a person) is detected by a distributed sensing system (e.g., the distributed sensing system 400 of FIG. 4), as described herein. The object 512 is detected in a hallway 514 of a western portion of the building 502. As shown in diagram 520 of FIG. 5B, as the object 512 moves in an easterly direction, the object 512 enters a room 524 of the building 502. By utilizing sensing devices distributed throughout the building 502, the distributed sensing system can determine where the object 512 is located. Thereafter, as shown in diagram 530 of FIG. 5C, the object 512 moved from the room 524, into the hallway 514, and into another room 534. In the room 534, the distributed sensing system can detect the position of the object 512 in the room 534. For example, the object 512 in diagram 530 of FIG. 5C, the object 512 is detected to be in the south-easterly corner of the room 534.

The sensing devices (e.g., such as access points and/or wireless devices) of the distributed sensing system can also be utilized to receive and collect channel estimation information and data from the sensing devices. In some examples, the distributed sensing system can include synchronized cameras, phone applications, or other devices or applications to receive and collect corresponding labels of the detected objects. As discussed herein, the distributed sensing system can utilize the large amount of sensing data and associated ground truth labels for each corresponding data point. For example, in the radio frequency sensing context, the sensing data can be represented by the collected radio frequency channel signatures, and the labels can include location of motion and type of motion, per each data point. Labelling can include either a manual input or a detection system that provides a ground truth that can be used along with a loss function to train a machine learning system to perform one or more radio frequency sensing based detection operations (e.g., to detect the position and/or motion of a target object, etc.). In some cases, camera systems can include automatic detection and mapping of object position.

Figure 6:
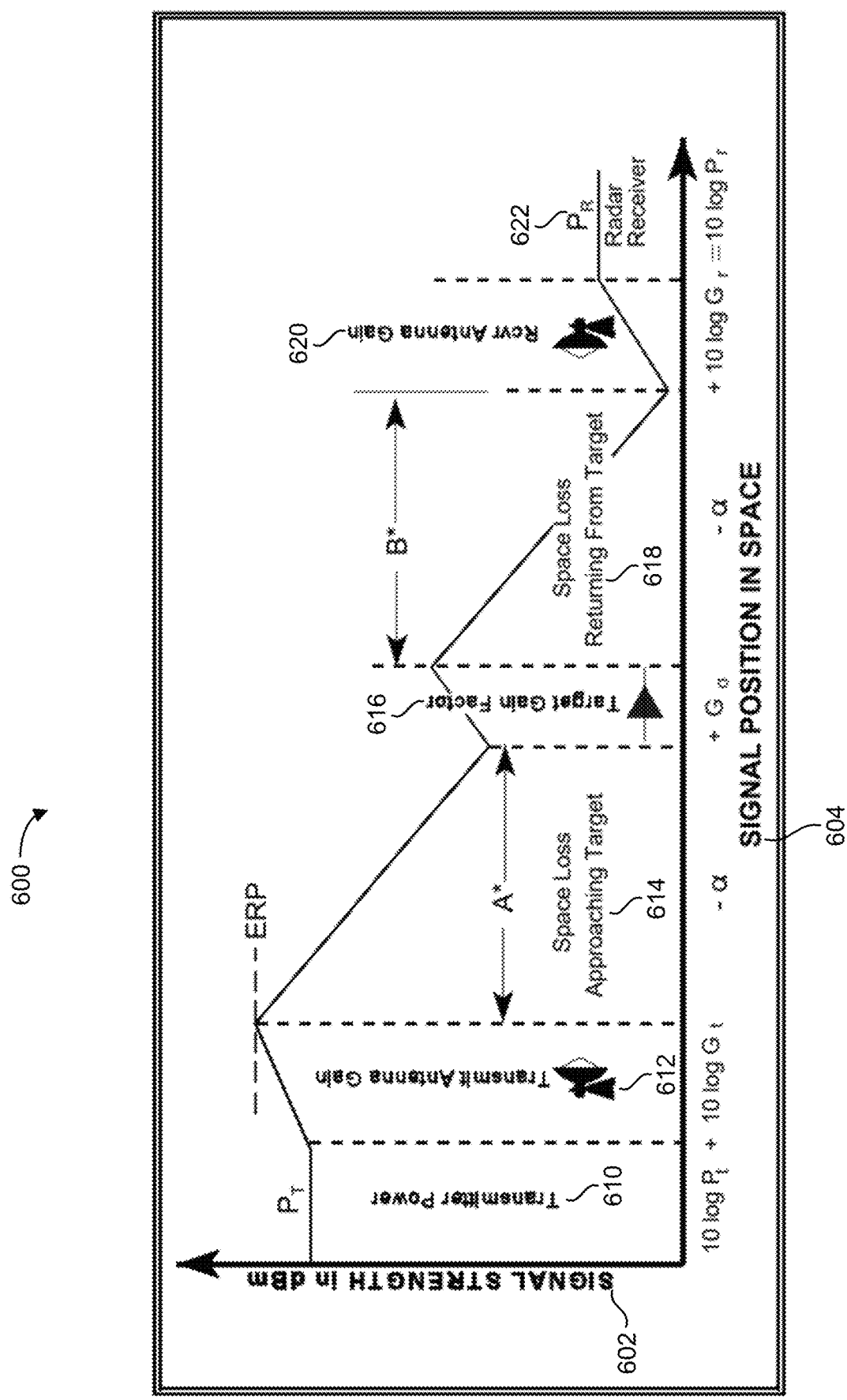
FIG. 6 is a diagram illustrating an example graph of signal strength versus signal position in space, in accordance with some examples.

In some implementations, to detect an event in an environment by the distributed sensing system, there may need to be a strong enough signal so that the reflected signal can reach the receiver of a sensing device of the distributed sensing system. As illustrated in FIG. 6, the strength of the signal can depend on at least the transmit power of the sensing device, the antenna gains of the sensing device, and the distance between the transmitter, the target, and the receiver. For example, the greater the transmit power, the more likely the reflected signal will reach the receiver of the corresponding sensing device. If the transmit power is too low, the reflected RF signal may be too low to be detected by the receiver of the sensing device. Similarly, if antenna gains are too low, the receiver may not sufficiently receive the reflected RF signal. Distance also affects the quality of transmitted signals and reflected signals. For example, the greater the distance between two sensing devices (e.g., pathloss) or the transmitter and receiver of the same sensing device, depending of the configuration of the distributed sensing system, the lower the signal strength will be for the RF signal and the reflected RF signal. Path loss (e.g., space loss 614, 618 of FIG. 6), or path attenuation, is the reduction in power density of an electromagnetic wave as the signal propagates through space. The strength of the signal can also depend on the type of target. For example, if a target is small in size (e.g., 1 inch in diameter, 3 inches in diameter, 6 inches in diameter, etc.), the surface area of the target may be small and thus only a small amount of RF signals may reflect off of the target. If the target is large in size, the target will have a large surface area that reflects a large amount of RF signals. Reflectivity of a target can be referred to as a radar cross section. The distributed sensing system can measure the strength of signals reflected from different objects. Based on the signals, reflected signals, and the strength of the signals, the distributed sensing system can predict aspects of the target, such as location and movement of the target. However, if the target is far from the sensing devices, the signals received by the distributed sensing system may be too weak to detect a location of the target or other aspect of the target. If the target is closer to the sensing devices, the signals reflected by the target may have enough signal strength for the distributed sensing system to make accurate detections.

FIG. 6 is a diagram illustrating an example graph 600 of signal strength 602 versus signal position in space 604 with respect to detecting an object. In some implementations, a distributed sensing system (e.g., the distributed sensing system 400 of FIG. 4) can detect events in an environment that can be represented as a function of signal strength (e.g., of radio frequency signals) received by a sensing device. The radio frequency signals can be generated as reflected radio frequency signals by a target sensing device. In some implementations, the signal strength of the radio frequency signals can be based on: transmission power; antenna gains; pathloss between a transmitter and a reflector, as a function of sensing devices and a target location; pathloss between the reflector and the receiver, as a function of the sensing devices and the target location; reflectivity of the target (e.g., radar cross section (RCS)); receiver specifications; any combination thereof; and/or other factors. In some cases, RCS can be determined as a function of the target size and/or shape. In some cases, antenna gains can be approximated by the distributed sensing system. The distributed sensing system can predict a received sensing signal caused by a target at a given location, such as based on received signal strength indicators (RSSIs), pathloss measurements, and/or other factors.

Referring to FIG. 6, the graph 600 illustrates transmitter power ($P_T$) 610, transmit antenna gain ($G_t$) 612, space loss 614 approaching target ($\alpha$), target gain factor ($G_\alpha$) 616, space loss 618 returning from target ($\alpha$), receiver antenna gain ($G_r$) 620, and receiver power ($P_r$) 622. The distributed sensing system can further determine effective radiated power (ERP). For example, if power is measured in region A (e.g., the space loss 614 approaching target) or region B (e.g., the space loss 618 returning from target), the power can be stated in either power density ($mW/cm^2$) or field intensity (V/m).

Signal strength versus signal position in space of FIG. 6 can be defined by the following equation: $10 \log P_t + 10 \log G_t - \alpha + G_\sigma - \alpha + 10 \log G_r = 10 \log P_r$.

Figure 7:
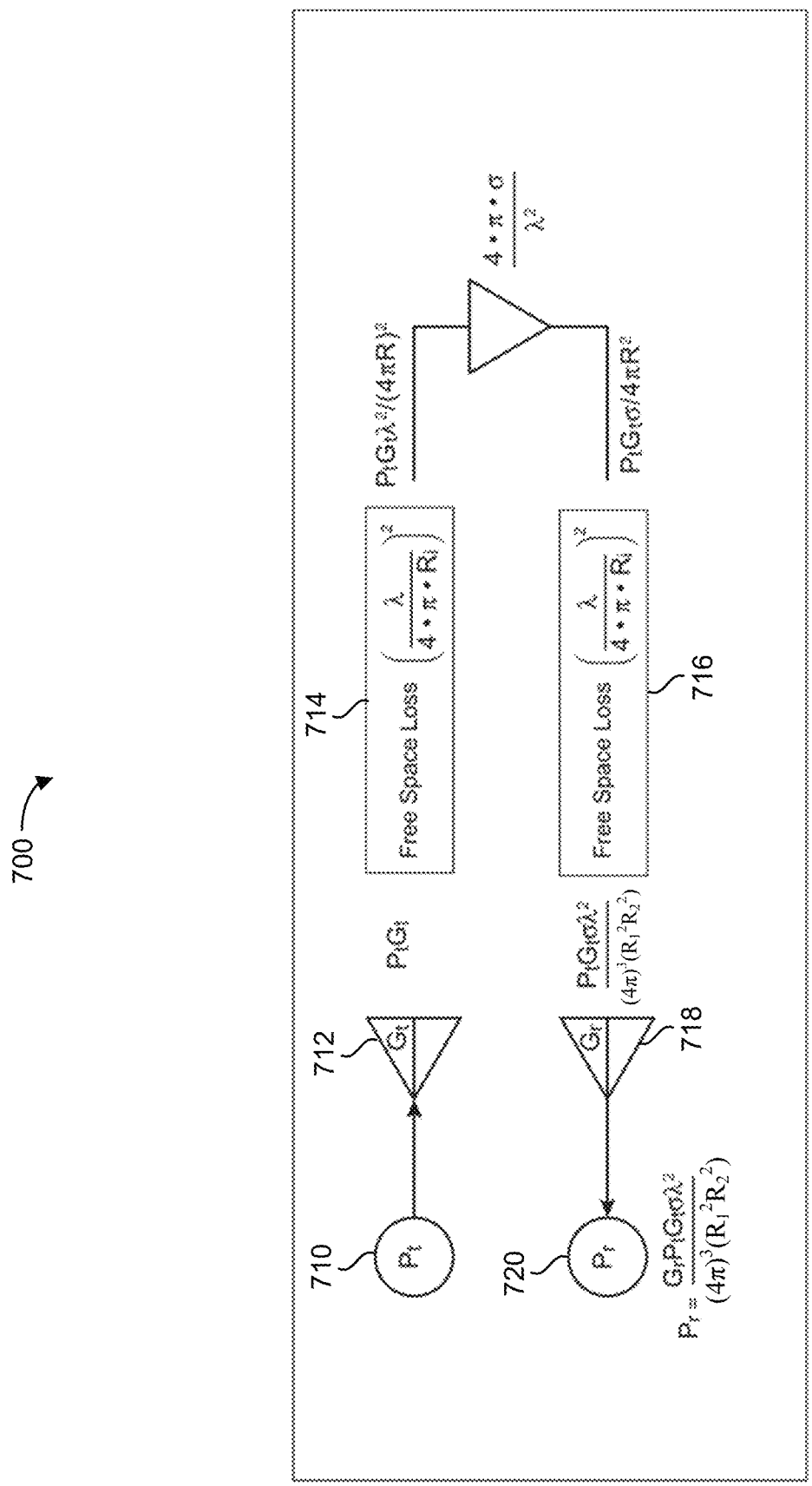
FIG. 7 is a diagram illustrating an example block diagram for radar cross section measurements, in accordance with some examples.

FIG. 7 is a diagram illustrating an example block diagram for radar cross section measurements 700. For example, radar cross section measurements can include transmitter power ($P_T$) 710, transmit antenna gain ($G_t$) 712, free space loss 714, 716

$$\left(\left(\frac{\lambda}{4 \cdot \pi \cdot R_i}\right)^2\right),$$

receiver antenna gain ($G_r$) 718, and receiver power ($P_r$) 720

$$\left(\text{e.g., } p_r = \frac{G_r P_t G_t \sigma \lambda^2}{(4\pi)^3 (R1^2 R2^2)}\right).$$

The radar cross section measurements 700 can further utilize the following equations: $P_t G_t \lambda^2/(4\pi R)^2$, $(4 \cdot \pi \cdot \sigma)/\lambda^2$, $P_t G_t \lambda^2/4\pi R^2$, and $P_t G_t \sigma \lambda^2/(4\pi)^3(R_1^2 R_2^2)$. $\lambda$ refers to a wavelength of a radio frequency signal. $R_i$ refers to a distance from a transmitter or receiver to a target. For instance, $R_1$ refers to a distance between a transmitter and a target, and $R_2$ refers to a distance between a target and a receiver. $\sigma$ refers to a radar cross section (RCS). Power and wavelengths of the radio frequency signals can also be adjusted by the distributed sensing system to optimize quality and range of the radio frequency signals.

FIGS. 8A and 8B are diagrams illustrating examples of heat maps 810, 820 representing sensing coverage provided by sensing devices 802, 804, 806 of a distributed sensing system as described herein. For example, the heat maps 810, 820 can be generated by utilizing measurements from a measurement device as described herein, which can approximate heat maps generated from sensing data. In one aspect, the actual RF sensing coverage for a specific detection task can be approximated by using either the measurements from the measurement device or sensing measurements where the system only estimates variations of the RF sensing signal (and not the exact desired detection). In some aspects, the distributed sensing system can utilize the algorithms as illustrated and described in FIGS. 6 and 7 to generate the heat maps 810, 820. For example, heat map 810 illustrates coverage utilizing the sensing devices 802, 804, while heat map 820 illustrates coverage utilizing the sensing devices 804, 806. Throughout each of the heat maps 810, 820, a range of sensing coverage is illustrated between −60 dBm and −100 dBm. For example, "best" sensing coverage is approximately −60 dBm 834, "good" sensing coverage is approximately −80 dBm 832, and "bad" sensing coverage is approximately −100 dBm 830. In some aspects, the distributed sensing system can generate the heat maps 810, 820 by estimating the received signal strength associated with the sensing devices 802, 804, 806. The distributed sensing system can utilize the algorithms of FIGS. 6 and 7 to estimate the received signal strengths of the corresponding RF sensing signals.

Whether the RF sensing coverage estimated for a certain location is indicative of a good or bad RF sensing coverage can be determined by comparing the estimation to a threshold. The threshold may be manually configured or may be derived from the sensing data. For example, the threshold may be based on an estimation of the RF sensing noise. The RF sensing noise can be referred to as the amplitude or energy of the RF sensing signal variation in the absence of the action to be detected (e.g., in the absence of motion). Such variations may be caused by thermal noise, artifacts of the devices, or vibrations in the environment that are not the subject of detection. For example, if a person is located within the floor plan, the distributed sensing system can estimate a signal received at another sensing device 804. In this instance, the distributed sensing system determines that the signal is received with a signal strength of minus 85 dBm. If this is above the noise threshold, then there is good sensing coverage. In another example, if the person is located outside of the floor plan (e.g., outside of a house), the distributed sensing system measures the signal associated with the person outside and measures a signal strength of minus 100 dBm, which is below the noise threshold and is considered to be bad sensing coverage.

The heat maps 810, 820 provide a visual gradation of the sensing coverage provided the distributed sensing system. For example, in the heat map 810, the best sensing coverage by the distributed sensing system is provided towards the lower-left portion of the floor plan. In heat map 820, the best sensing coverage by the distributed sensing system is provided towards the center and upper-center of the floor plan. As described herein, the quality of sensing coverage provided by the distributed sensing system can be a factor of the layout (e.g., the position and/or quantity) of the sensing devices of the distributed sensing system.

In some implementations, the distributed sensing system can include a plurality of sensing devices in an environment, such as Wi-Fi mesh access points and wireless devices, as described herein. The distributed sensing system can include deploying the sensing devices in an environment to be monitored (e.g., a dwelling or a company building) in a particular layout (e.g., with a certain number of sensing devices in various positions throughout the environment). Deployment of the distributed sensing system can include guiding a user to reposition the sensing devices to provide optimal sensing coverage area of the environment. For example, the distributed sensing system can provide sensing coverage of an environment to perform one or more radio frequency sensing based detection operations, such as determining the position of an object, by utilizing radio frequency sensing signals captured by the sensing devices. By receiving reflected radio frequency sensing data (e.g., RSSI/CSI data) from the sensing devices, the distributed sensing system can determine the position of objects within the sensing coverage of the distributed sensing system.

As described herein, the distributed sensing system can provide sensing coverage to a wireless device (e.g., a mobile device) associated with the user. The sensing coverage provides feedback related to a suggested layout (e.g., position, distance between, etc.) of existing and/or new (to-be-added) sensing devices in the environment. For example, as a user walks around a given environment, the distributed sensing system can receive radio frequency sensing data from the various radio frequency sensing devices in the general vicinity. The distributed sensing system can then determine whether the position of the new sensing device is at an appropriate location based on sensing or positional data, such as a location that extends or increasing signal strength output of an area of interest.

In some cases, the distributed sensing system can determine which subsets of device-to-device links to use for future sensing training. For example, a first sensing device and a second sensing device can be determined by the distributed sensing system to provide an optimal device-to-device link. In such a case, the first and second sensing device can be utilized by the distributed sensing system when adding new sensing devices to the distributed sensing system to provide sensing data regarding the new sensing device at various locations.

The user may initially position the sensing devices with a particular layout throughout the environment (e.g., the user's home). In some implementations, a user can provide information and data to the distributed sensing system. For example, the user can provide sets of labels for training of a machine learning system used by the distributed sensing system to perform a task of interest (e.g., motion detection/location). In another example, the user can visit some or all of the rooms in the environment and can input information to a device providing indications of the user's status relative to each room (e.g., "I'm in room X"). The information can be provided to the distributed sensing system for analysis. In some examples, the user can provide a sketch or layout of the environment, which can include an indication of the number of and/or the initial positions of the sensing devices deployed in the environment. Based on the information, the distributed sensing system can provide the user with directions or data that indicate which areas of the floor plan include good or bad coverage, as illustrated in FIGS. 8A and 8B. The distributed sensing system can provide the user with instructions of where to reposition the sensing devices, whether to add one or more new sensing devices, whether to switch sensing frequencies utilized by the sensing devices, and/or other feedback that can result in providing optimal sensing coverage by the distributed sensing system. As described herein, the optimal sensing coverage provides the ability of the distributed sensing system to perform radio frequency sensing based detection operations, such as to detect an object and determine a position and movement of the object in a given environment.

In some examples, interference can be experienced by the distributed sensing system. For example, interference can be received from neighboring wireless devices utilizing the same frequencies as the sensing devices. The distributed sensing system can take into account the interference to determine whether to inform a user to reposition sensing devices, add new sensing devices, or switch sensing frequencies utilized by the sensing devices. For example, if a majority of sensing devices are utilizing the 2.4 GHz bandwidth, the sensing devices may interfere with one another, thereby potentially providing erroneous signals and signal measurements to the distributed sensing system.

Figure 9B:
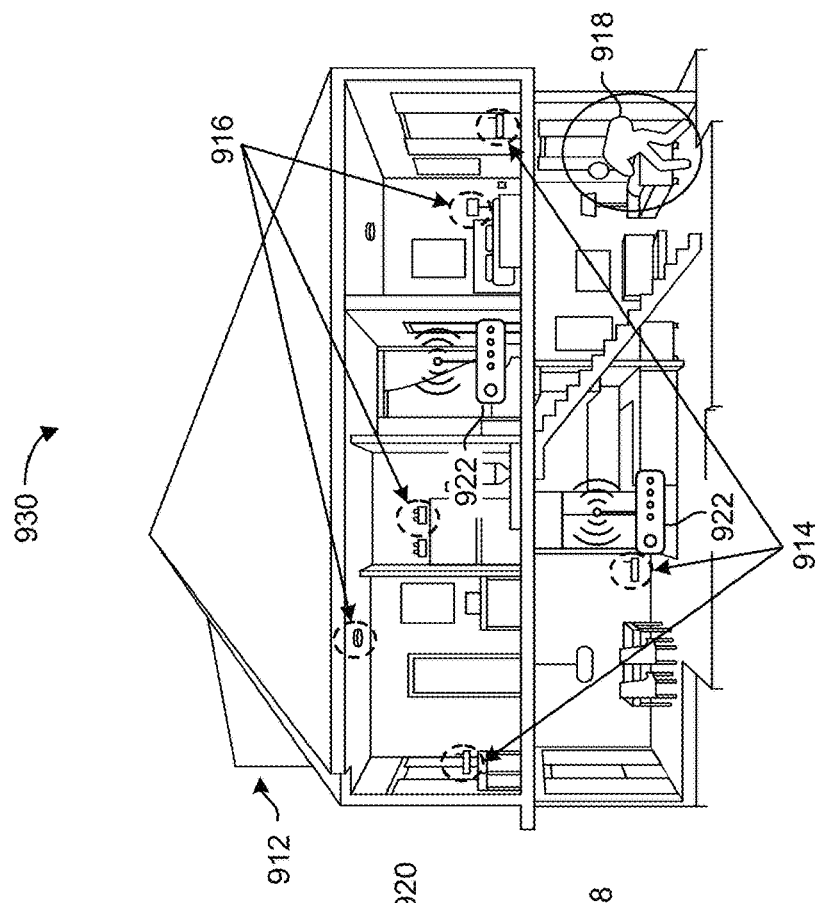
FIGS. 9A and 9B are diagrams illustrating examples of good and bad deployment of sensing devices, in accordance with some examples.
Figure 9A:
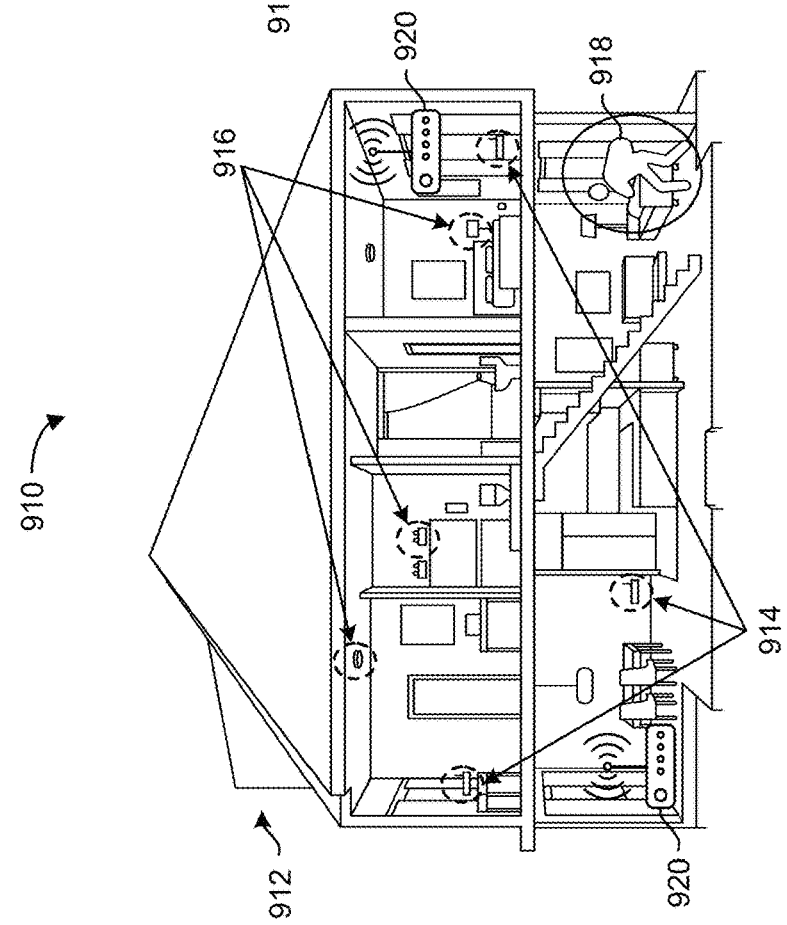

FIGS. 9A and 9B are diagrams illustrating examples of a bad sensing device deployment 910 (FIG. 9A) and a good sensing device deployment 930 (FIG. 9B) of sensing devices 922, 920 (e.g., access points or other sensing devices) at a residence 912. For example, sensing device deployment 910 illustrates a "bad" deployment of the sensing devices 920, while sensing device deployment 930 illustrates a "good" deployment of the sensing devices 922. The quality of the deployment of the sensing devices 920, 922 of the distributed sensing system are for sensing purposes, such as for sensing device positioning, object motion detection, etc. In the sensing device deployment 910, the sensing devices 920 are positioned too far apart from one another, thereby experiencing "dead zones" in the sensing coverage towards the center of the residence 912. In the sensing device deployment 930, the sensing devices 922 are positioned towards the center of the first and second floors of the residence 912. This arrangement of the sensing devices 922 provides a distributed sensing system with a maximum sensing coverage, as the distributed sensing system can provide sensing coverage towards the center and edges of the residence 912. By providing adequate sensing coverage by the distributed sensing system, the distributed sensing system can detect intruders and unauthorized personnel 918.

The feasibility or accuracy of sensing detections is a function of the position of sensing devices 914, 916, 920, 922 (e.g., which can include access points and/or wireless devices) of the distributed sensing system. For example, when a user intends to deploy the sensing devices 920, 922 of the distributed sensing system at their residence 912, it would be beneficial to the user to be provided with a simple way of determining whether placement of the sensing devices 920, 922 is appropriate to cover areas of interest and how/where to move the sensing devices 920, 922. The distributed sensing system, as described herein, can provide a user-friendly way for estimating the detection coverage area of a given deployment of sensing devices 920, 922. The distributed sensing system can include sensing operations that can include training such as obtaining sensing measurements throughout a floor plan.

In some implementations, the distributed sensing system can include various processes for estimating sensing coverage. Estimating sensing coverage based on deployment of the sensing devices 914, 916, 920, 922 of the distributed sensing system are for sensing purposes, such as for sensing device positioning, object motion detection, etc. For example, the distributed sensing system can measure the signal strength between each pair of sensing devices 914, 916, 920, 922. If two sensing devices 914, 916, 920, 922 are too far from each other (e.g., include a weak radio frequency signal), it is likely that the sensing detection will be weak and perhaps unusable. If the two sensing devices 914, 916, 920, 922 are too close, then sensing coverage may not be optimized for the predetermined or given floor plan. Metrics (e.g., including sensing and radio frequency signal information and data such RSSI/CSI data) based on initial sensing measurements can provide some necessary, but insufficient conditions, for a good sensing coverage estimate. For example, the initial process of setting up the sensing devices 914, 916, 920, 922 of the distributed sensing system can be inconclusive. In such a case, the distributed sensing system can provide messages or indications to a wireless device associated with a user that can provide instructions as to sensing device 914, 916, 920, 922 positioning to better detect objects in the environment. After repositioning of the sensing devices 914, 916, 920, 922, the distributed sensing system can receive sensing measurements (e.g., RSSI/CSI data) from the sensing devices 914, 916, 920, 922 to determine whether the new positions of the sensing devices 914, 916, 920, 922 provide adequate sensing coverage for sensing purposes, such as for sensing device positioning, object motion detection, etc.

In other implementations, the distributed sensing system can include obtaining sensing measurements (e.g., RSSI/CSI data) by having the user utilize a sensing measuring device (e.g., a mobile phone) and measure signal strength between the sensing measuring device and each of the other sensing devices 914, 916, 920, 922 distributed throughout the floor plan of the environment for sensing purposes, such as for sensing device positioning, object motion detection, etc. By utilizing a sensing measuring device, the distributed sensing system can provide an accurate, zone-dependent estimation (e.g., heat maps 810, 820 of FIGS. 8A and 8B), while actual RCS measurements can be approximated. For example, the user can carry the measuring device and measure the signal strength of RF signals between the measuring device and other sensing devices at multiple locations of interest. This can allow the measurement of two paths (e.g., transmit path and receive path) including the signal strength between the sensing devices 914, 916, 920, 922 and the measuring device. Moreover, if the sensing device are access points, the access points can continuously or periodically provide beacons to sensing devices 914, 916, 920, 922 and other wireless devices. A beacon transmission (e.g., reference signal) can include transmitter power field data that can indicate the power used for transmitting the beacon. In some aspects, beacons can be utilized by sensing devices 914, 916, 920, 922 and other wireless devices to measure signal levels (e.g., based on RSSI and/or CSI data) for sensing purposes, such as for sensing device positioning, object motion detection, etc. In other aspects, the measuring device that the person is carrying can continuously or periodically measure the signal strength of the beacons. The measuring device can further measure channel variations that are induced by the person walking through the environment. By measuring the strength of the respective signal, the distributed sensing system can determine sensing coverage of an environment for sensing purposes, such as for sensing device positioning, object motion detection, etc.

As disclosed herein, the distributed sensing system can measure channel variations induced by a target (e.g., a person or object) moving between different locations of interest for sensing purposes, such as for sensing device positioning, object motion detection, etc. For example, the distributed sensing system can initiate a sensing procedure where the distributed sensing system collects channel state information (CSI) measurements from the sensing devices 914, 916, 920, 922 relating to one or more sensing links between sensing devices 914, 916, 920, 922 of the distributed sensing system, while the target is moving in the areas of interest. The distributed sensing system can also provide more metric information (e.g., CSI data) closer to the sensing operation for sensing purposes, such as for sensing device positioning, object motion detection, etc. Sensing devices 914, 916, 920, 922 of the distributed sensing system can also compute the metric information (e.g., CSI data) for some or all of the pairs (e.g., sensing links between pairs of sensing devices 914, 916, 920, 922) to determine which sensing devices are detecting radio frequency signals sufficient to facilitate radio frequency sensing for sensing purposes, such as for sensing device positioning, object motion detection, etc., even a subset of the sensing devices 914, 916, 920, 922 can be sufficient for the distributed sensing system.

The distributed sensing system can further be configured to provide feedback to the user to improve placement of the sensing devices 914, 916, 920, 922 for sensing purposes, such as for sensing device positioning, object motion detection, etc. For example, the distributed sensing system can calculate or compute a sensing coverage (e.g., the motion alert 432 of FIG. 4 and the heat maps 810, 820 of FIGS. 8A and 8B), which can then be provided to a wireless device (e.g., mobile device) associated with the user via a user interface (e.g., a web or text interface). The sensing coverage of the distributed sensing system can also be displayed on the user's mobile device or application of the mobile device as shown in FIG. 4. For example, a graphic user interface (GUI) of the user's mobile device can indicate: "Access point 1 and 2 are too far" or " . . . too close;" "In your current position, the sensing detection is weak, move Access Point 2 closer to this area;" "In your current position, we cannot detect your motion, move or add one access point closer to this area;" the computed sensing coverage is displayed on one or more of the sensing devices; a red light, which can indicate that the access point is too far from other access points, green light, which can indicate that the access point is in a good position; and text or voice message (e.g., AI personal assistant) that can indicate to move the access point closer 1 to access point 2.

In some implementations, the distributed sensing system can further be configured to include sensing coverage determination for sensing purposes, such as for sensing device positioning, object motion detection, etc. For example, a user can utilize a measuring device that is communicatively connected to the distributed sensing system. Initially, the user can place the sensing devices 914, 916, 920, 922 at predetermined locations throughout an environment based on available space or predetermined guidelines. The user can also walk around areas of interest while utilizing a sensing device (e.g., wireless device) for sensing purposes, such as for sensing device positioning, object motion detection, etc. The sensing link quality between the sensing device and each of the other positioned sensing devices can be measured by the distributed sensing system for sensing purposes, such as for sensing device positioning, object motion detection, etc.

Figure 10:
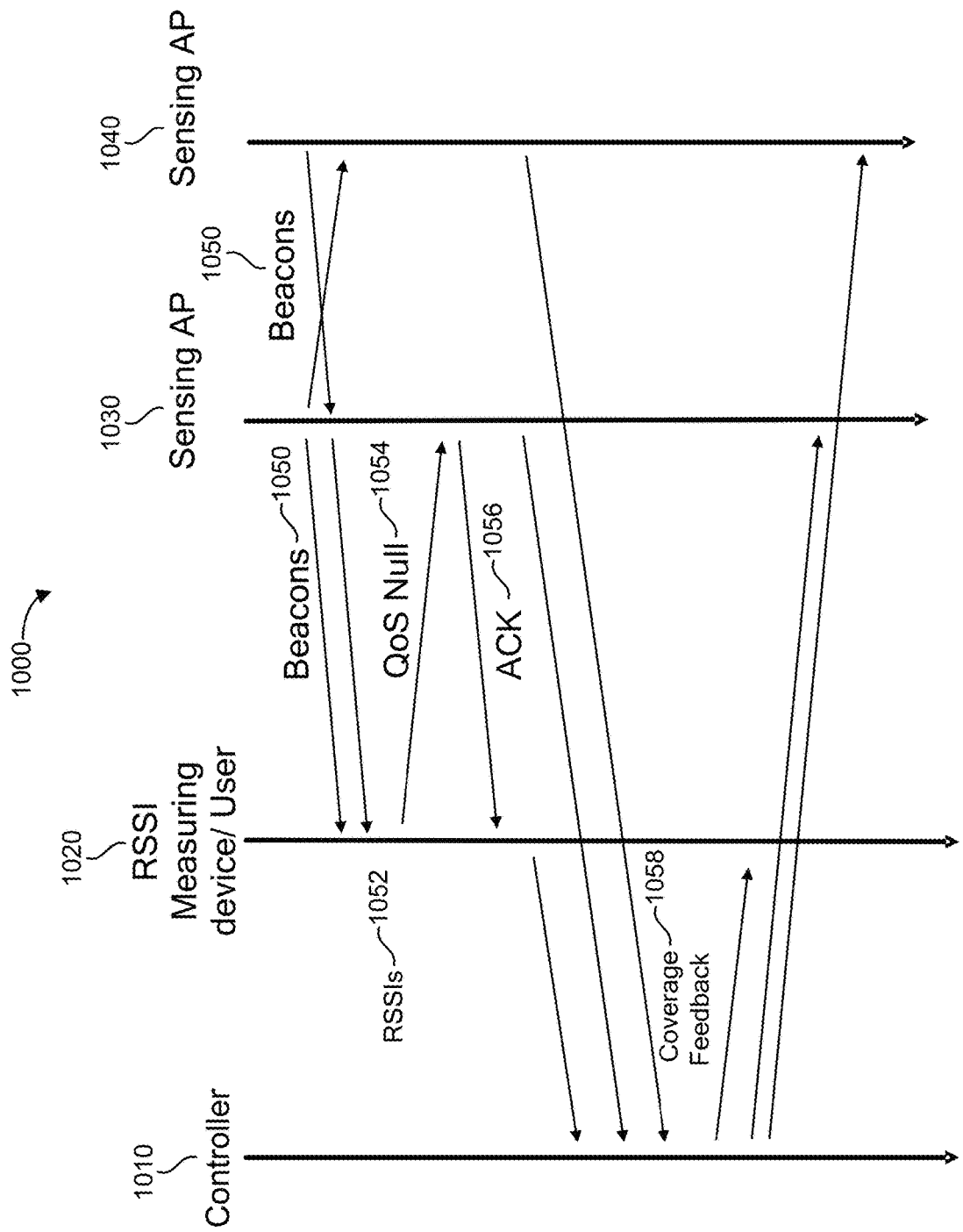
FIG. 10 is a diagram illustrating an example operation performed by a distributed sensing system, in accordance with some examples.

FIG. 10 is a diagram illustrating an example operation performed by a distributed sensing system 1000 for sensing purposes, such as for sensing device positioning, object motion detection, etc. The distributed sensing system 1000 can include a controller 1010, RSSI measuring device 1020 (e.g., a sensing device as described herein), and sensing access points 1030, 1040 (as examples of sensing devices). Received signal strength indicator (RSSI) and/or channel state information (CSI) 1052 can also be measured by the distributed sensing system 1000 based on reference signals such as the beacons 1050 from the sensing access points 1030, 1040, or by providing poll frames 1054 (e.g., quality of service (QoS) null) and recording the RSSI of a response acknowledgement 1056 ("ACK").

In other implementations, the sensing access points 1030, 1040 of the distributed sensing system 1000 can poll the RSSI measuring device 1020 and measure the RSSI or CSI response 1052. In some aspects, the sensing access points 1030, 1040 can be made aware of the RSSI measuring device 1020 transmission power to compare expected and measured signal parameters such as RSSI data. The RSSI measuring device 1020 and the sensing access points 1030, 1040 of the distributed sensing system 1000 can further support Fine Time Measurements Fine Time Measurements is a protocol that can allow two wireless devices to perform round-trip time (RTT) measurements between each other to determine the distance between the two wireless devices, which can include the distance between the RSSI measuring device 1020 and each sensing device of the distributed sensing system 1000 (e.g., sensing access points 1030, 1040) for sensing purposes, such as for sensing device positioning, object motion detection, etc. In some aspects, RTT measurements can augment the RSSI information for a more optimal sensing coverage determination and/or position the measurement device with respect to the sensing devices so that each RSSI/CSI measurement can be associated to a specific location, thereby providing the ability to generate a heat map. Additionally, each sensing device of the distributed sensing system 1000 (e.g., sensing access points 1030, 1040) can measure a signal strength, CSI, and distance between each pair of sensing devices of the distributed sensing system 1000.

Data measured by the RSSI measuring device 1020 and the sensing access points 1030, 1040 can then be provided to the controller 1010 of the distributed sensing system 1000 for sensing purposes, such as for sensing device positioning, object motion detection, etc. The controller 1010 of the distributed sensing system 1000 can utilize the measured data to generate expected sensing coverage provided by each transmitter/receiver sensing device pair (or per each monostatic device). The controller 1010 can also be a sensing device as described herein such as an access point or a wireless device such as a mobile phone. The controller 1010 of the distributed sensing system 1000 can also provide sensing coverage feedback 1058 in real time to a wireless device of a user, either via the RSSI measuring device 1020, through a cloud service, or by an indication at each of the sensing access points 1030, 1040 (e.g., a light color, a message, or a display of an icon). The controller 1010 of the distributed sensing system 1000 can also record the measured data for processing at a later time.

Figure 11:
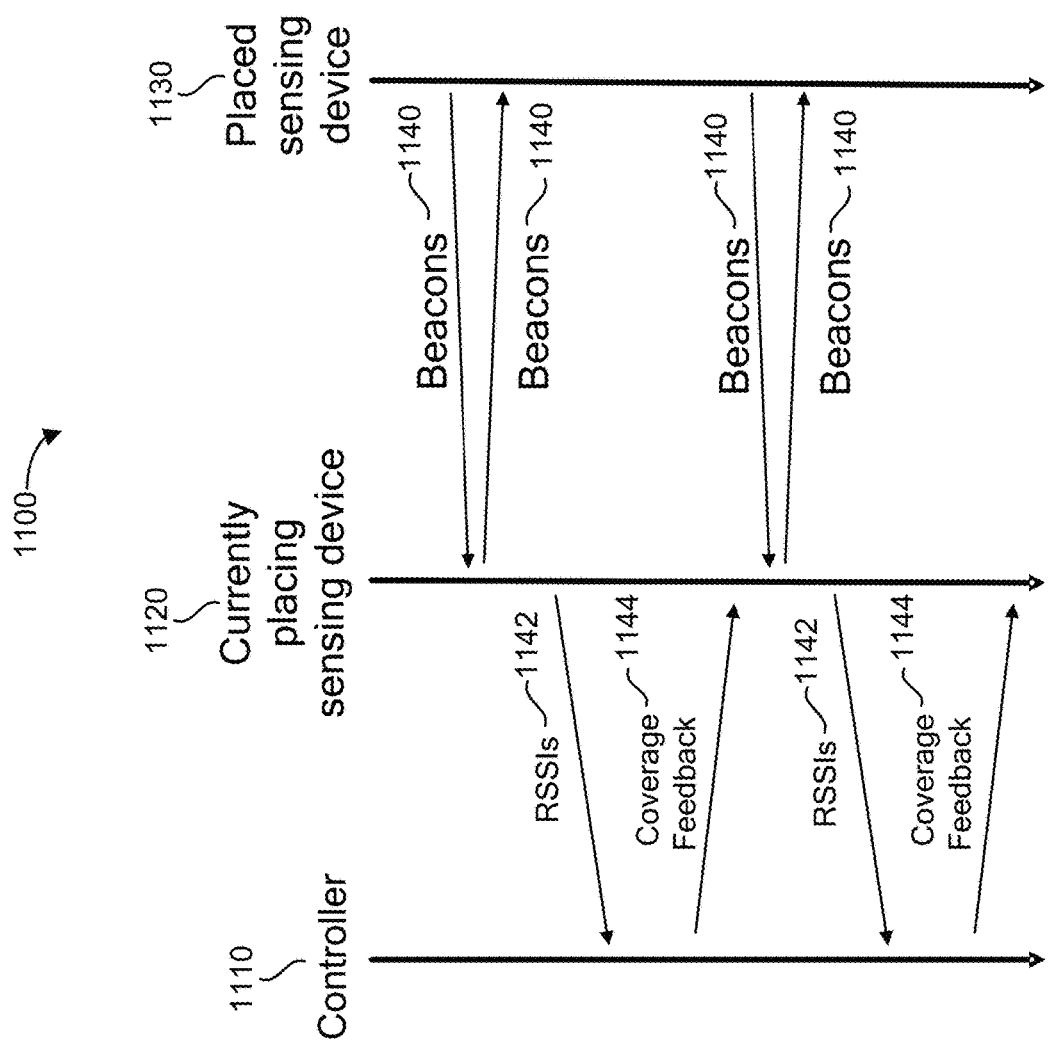
FIG. 11 is a diagram illustrating another example operation performed by a distributed sensing system, in accordance with some examples.

FIG. 11 is a diagram illustrating another example operation performed by a distributed sensing system 1100 for sensing purposes, such as for sensing device positioning, object motion detection, etc. The distributed sensing system 1100 can include a controller 1110, a currently placing sensing device 1120, and a placed sensing device 1130. Access points (e.g., the sensing devices 1120, 1130 of the distributed sensing system 1100) can be utilized by the distributed sensing system 1100 to indicate to a wireless device of a user (e.g., in real time) whether current locations of the access points are suitable for performing sensing operations and/or when attempting to add a new sensing device to the distributed sensing system 1100 for sensing operations, such as for sensing device positioning, object motion detection, etc. For example, the distributed sensing system 1100 can provide: LED colors indicating the "quality" of the user's location by utilizing colors or blinking color patterns (e.g., heat maps 810, 820 of FIGS. 8A and 8B); sound or voice feedback from an artificial intelligence personal assistant; and a user interface (e.g., a web interface) accessible via a wireless device communicatively coupled to the distributed sensing system 1100.

In other implementations, the distributed sensing system 1100 can direct a user to position the sensing devices 1120, 1130 at different locations and provide immediate feedback as to whether the location of the currently placing sensing device 1120 is suitable or not for sensing purposes, such as for sensing device positioning, object motion detection, etc. The sensing devices 1120, 1130 can measure RSSI data 1142 (and/or in some cases CSI data) from other sensing devices 1120, 1130 to approximate the predicted sensing coverage. The extrapolation of sensing coverage based on measured RSSI data 1142 can further be based on past average measurements received by the distributed sensing system 1100. The RSSI data 1142 can then be provided to the sensing controller 1110 of the distributed sensing system 1100. The controller 1110 of the distributed sensing system 1100 can compute the expected sensing coverage for each transmitter/receiver sensing device pair 1120, 1130 (or per each monostatic device) for sensing purposes, such as for sensing device positioning, object motion detection, etc. The controller 1110 of the distributed sensing system 1100 can also provide the determined sensing coverage to a wireless device of the user to inform the user of sensing device positioning and object motion detection.

In other implementations, the distributed sensing system 1100 can include a plurality of sensing devices 1120, 1130 positioned throughout an environment for sensing purposes, such as for sensing device positioning, object motion detection, etc. The sensing devices 1120, 1130 can exchange radio frequency sensing signals, which can be utilized to detect motion of an object. The sensing devices 1120, 1130 of the distributed sensing system 1100 can further utilize beacons 1140 associated with nearby sensing devices, access points, and wireless devices to estimate variations in RSSI data 1142 (and/or CSI), which can then be provided to the controller 1110 of the distributed sensing system 1100 for sensing purposes, such as for sensing device positioning, object motion detection, etc. For example, as the user walks through areas of interest, the controller 1110 of the distributed sensing system 1100 can utilize received RSSI data 1142 and then provide real time feedback 1144 to a wireless device (e.g., mobile device) associated with the user. The controller 1110 of the distributed sensing system 1100 can further provide indications to the wireless device of the user including: whether the current location of the wireless device is covered (e.g., includes good sensing coverage); or whether to take action to improve sensing coverage such as adding a new sensing device to the distributed sensing system 1100. The distributed sensing system 1100 can also provide the wireless device of the user with a preference for an "RCS" and a detection sensitivity level for sensing purposes, such as for sensing device positioning, object motion detection, etc. The detection sensitivity level can include information such as sensing signal strength as illustrated in heat maps 810, 810 of FIGS. 8A and 8B.

The distributed sensing system 1100 can further include visual simultaneous localization and mapping (VSLAM), which is a computational geometry technique used in devices with cameras, such as robots, head-mounted displays (HMDs), mobile handsets, and autonomous vehicles for sensing purposes, such as for sensing device positioning, object motion detection, etc. In VSLAM, a device can construct and update a map of an unknown environment based on images captured by the device's camera. The device can keep track of the device's pose within the environment (e.g., location and/or orientation) as the device updates the map. For example, the device can be activated in a particular room of a building and can move throughout the interior of the building, capturing images. The device can map the environment, and keep track of its location in the environment, based on tracking where different objects in the environment appear in different images. The mapping data can then be utilized by the distributed sensing system for sensing purposes, such as for sensing device positioning, object motion detection, etc.

Figure 12:
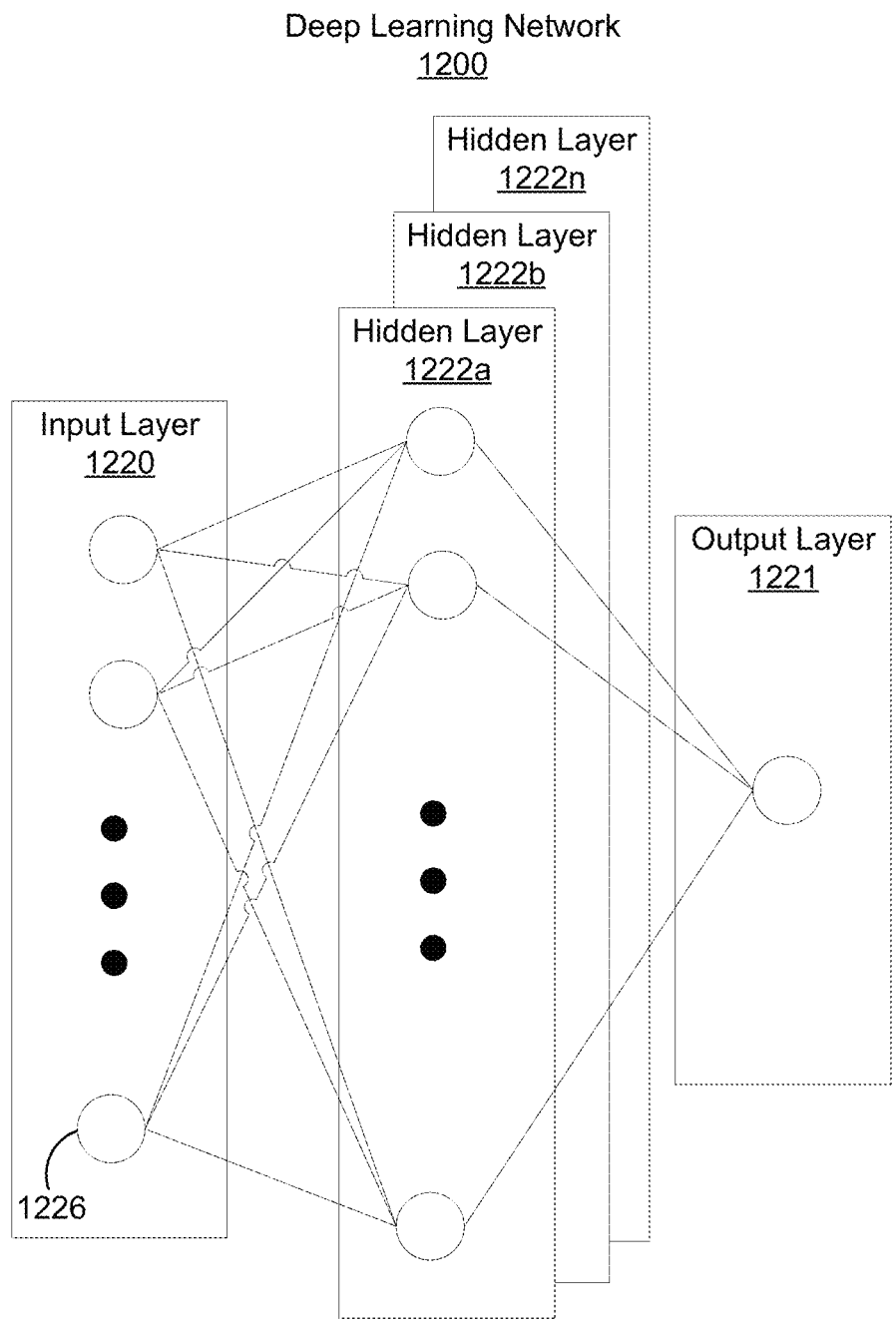
FIG. 12 is a block diagram illustrating an example of a deep learning neural network, in accordance with some examples.

FIG. 12 is an illustrative example of a deep learning neural network 1200 that can be used to implement the distributed sensing system described above. An input layer 1220 includes input data. In one illustrative example, the input layer 1220 can include data representing the pixels of an input video frame. The neural network 1200 includes multiple hidden layers 1222a, 1222b, through 1222n. The hidden layers 1222a, 1222b, through 1222n include "n" number of hidden layers, where "n" is an integer greater than or equal to one. The number of hidden layers can be made to include as many layers as needed for the given application. The neural network 1200 further includes an output layer 1221 that provides an output resulting from the processing performed by the hidden layers 1222a, 1222b, through 1222n. In one illustrative example, the output layer 1221 can provide a classification for an object in an input video frame. The classification can include a class identifying the type of activity (e.g., playing soccer, playing piano, listening to piano, playing guitar, etc.).

The neural network 1200 is a multi-layer neural network of interconnected nodes. Each node can represent a piece of information. Information associated with the nodes is shared among the different layers and each layer retains information as information is processed. In some cases, the neural network 1200 can include a feed-forward network, in which case there are no feedback connections where outputs of the network are fed back into itself. In some cases, the neural network 1200 can include a recurrent neural network, which can have loops that allow information to be carried across nodes while reading in input.

Information can be exchanged between nodes through node-to-node interconnections between the various layers. Nodes of the input layer 1220 can activate a set of nodes in the first hidden layer 1222a. For example, as shown, each of the input nodes of the input layer 1220 is connected to each of the nodes of the first hidden layer 1222a. The nodes of the first hidden layer 1222a can transform the information of each input node by applying activation functions to the input node information. The information derived from the transformation can then be passed to and can activate the nodes of the next hidden layer 1222b, which can perform their own designated functions. Example functions include convolutional, up-sampling, data transformation, and/or any other suitable functions. The output of the hidden layer 1222b can then activate nodes of the next hidden layer, and so on. The output of the last hidden layer 1222n can activate one or more nodes of the output layer 1221, at which an output is provided. In some cases, while nodes (e.g., node 1226) in the neural network 1200 are shown as having multiple output lines, a node has a single output and all lines shown as being output from a node represent the same output value.

In some cases, each node or interconnection between nodes can have a weight that is a set of parameters derived from the training of the neural network 1200. Once the neural network 1200 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 1200 to be adaptive to inputs and able to learn as more and more data is processed.

The neural network 1200 is pre-trained to process the features from the data in the input layer 1220 using the different hidden layers 1222a, 1222b, through 1222n in order to provide the output through the output layer 1221. In an example in which the neural network 1200 is used to identify activities being performed by a driver in frames, the neural network 1200 can be trained using training data that includes both frames and labels, as described above. For instance, training frames can be input into the network, with each training frame having a label indicating the features in the frames (for the feature extraction machine learning system) or a label indicating classes of an activity in each frame. In one example using object classification for illustrative purposes, a training frame can include an image of a number 2, in which case the label for the image can be [0 0 1 0 0 0 0 0 0 0].

In some cases, the neural network 1200 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until the neural network 1200 is trained well enough so that the weights of the layers are accurately tuned.

For the example of identifying objects in frames, the forward pass can include passing a training frame through the neural network 1200. The weights are initially randomized before the neural network 1200 is trained. As an illustrative example, a frame can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (e.g., red, green, and blue, or luma and two chroma components, or the like).

As noted above, for a first training iteration for the neural network 1200, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 1200 is unable to determine low level features and thus cannot make an accurate determination of what the classification of the object might be. A loss function can be used to analyze error in the output. Any suitable loss function definition can be used, such as a Cross-Entropy loss. Another example of a loss function includes the mean squared error (MSE), defined as $E\_total = \Sigma(\frac{1}{2}(target-output)^2)$. The loss can be set to be equal to the value of $E\_total$.

The loss (or error) will be high for the first training images since the actual values will be much different than the predicted output. The goal of training is to minimize the amount of loss so that the predicted output is the same as the training label. The neural network 1200 can perform a backward pass by determining which inputs (weights) most contributed to the loss of the network, and can adjust the weights so that the loss decreases and is eventually minimized. A derivative of the loss with respect to the weights (denoted as $dL/dW$, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $w = w\_i - \eta \, dL/dW$, where w denotes a weight, wi denotes the initial weight, and q denotes a learning rate. The learning rate can be set to any suitable value, with a high learning rate including larger weight updates and a lower value indicating smaller weight updates.

The neural network 1200 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 1200 can include any other deep network other than a CNN, such as an autoencoder, a deep belief nets (DBNs), a Recurrent Neural Networks (RNNs), among others.

Figure 13:
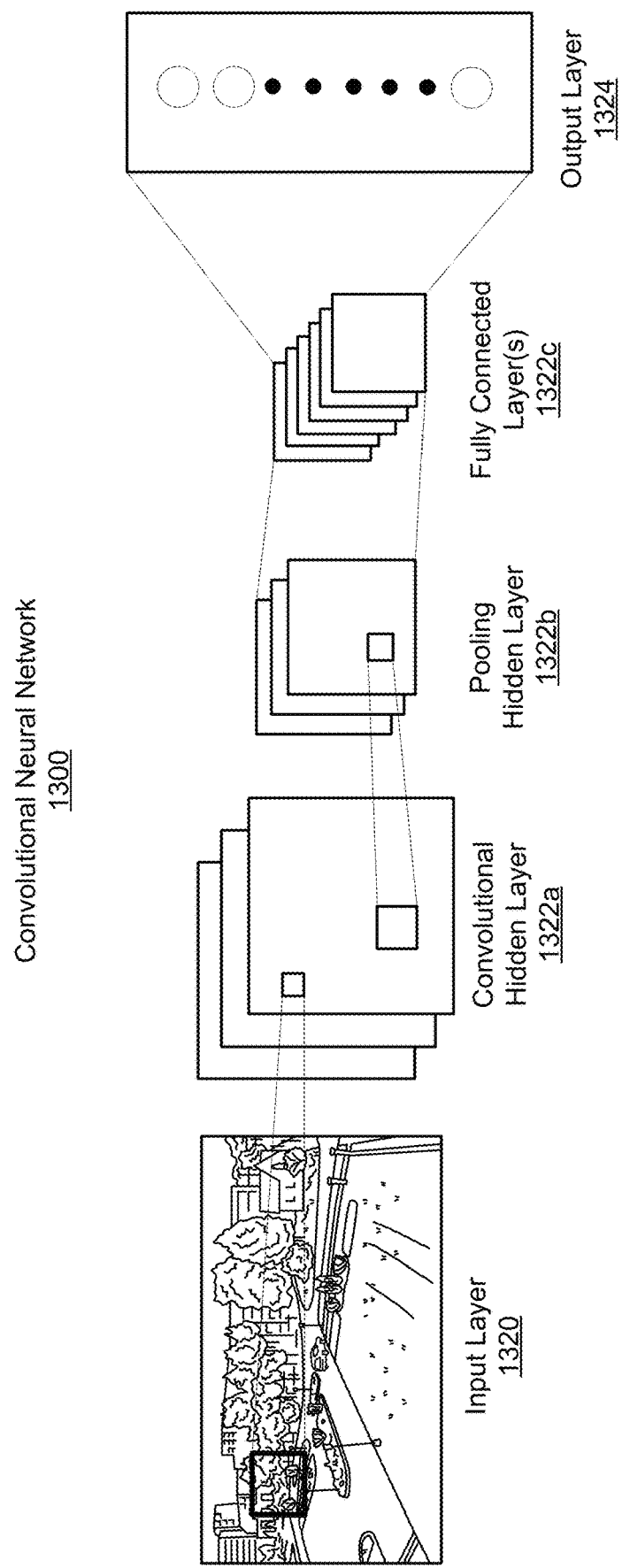
FIG. 13 is a block diagram illustrating an example of a convolutional neural network (CNN), in accordance with some examples.

FIG. 13 is an illustrative example of a convolutional neural network (CNN) 1300. The input layer 1320 of the CNN 1300 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1322*a*, an optional non-linear activation layer, a pooling hidden layer 1322*b*, and fully connected hidden layers 1322*c* to get an output at the output layer 1324. While only one of each hidden layer is shown in FIG. 13, one of ordinary skill will appreciate that multiple convolutional hidden layers, non-linear layers, pooling hidden layers, and/or fully connected layers can be included in the CNN 1300. As previously described, the output can indicate a single class of an object or can include a probability of classes that best describe the object in the image.

The first layer of the CNN 1300 is the convolutional hidden layer 1322*a*. The convolutional hidden layer 1322*a* analyzes the image data of the input layer 1320. Each node of the convolutional hidden layer 1322*a* is connected to a region of nodes (pixels) of the input image called a receptive field. The convolutional hidden layer 1322*a* can be considered as one or more filters (each filter corresponding to a different activation or feature map), with each convolutional iteration of a filter being a node or neuron of the convolutional hidden layer 1322*a*. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1322*a*. Each connection between a node and a receptive field for that node learns a weight and, in some cases, an overall bias such that each node learns to analyze its particular local receptive field in the input image. Each node of the hidden layer 1322*a* will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1322*a* is due to each node of the convolutional layer being applied to its corresponding receptive field. For example, a filter of the convolutional hidden layer 1322*a* can begin in the top-left corner of the input image array and can convolve around the input image. As noted above, each convolutional iteration of the filter can be considered a node or neuron of the convolutional hidden layer 1322*a*. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1322a. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1322a.

The mapping from the input layer to the convolutional hidden layer 1322a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 1322a can include several activation maps in order to identify multiple features in an image. The example shown in FIG. 13 includes three activation maps. Using three activation maps, the convolutional hidden layer 1322a can detect three different kinds of features, with each feature being detectable across the entire image.

In some examples, a non-linear hidden layer can be applied after the convolutional hidden layer 1322a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 1300 without affecting the receptive fields of the convolutional hidden layer 1322a.

The pooling hidden layer 1322b can be applied after the convolutional hidden layer 1322a (and after the non-linear hidden layer when used). The pooling hidden layer 1322b is used to simplify the information in the output from the convolutional hidden layer 1322a. For example, the pooling hidden layer 1322b can take each activation map output from the convolutional hidden layer 1322a and generates a condensed activation map (or feature map) using a pooling function. Max-pooling is one example of a function performed by a pooling hidden layer. Other forms of pooling functions be used by the pooling hidden layer 1322a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1322a. In the example shown in FIG. 13, three pooling filters are used for the three activation maps in the convolutional hidden layer 1322a.

In some examples, max-pooling can be used by applying a max-pooling filter (e.g., having a size of 2×2) with a stride (e.g., equal to a dimension of the filter, such as a stride of 2) to an activation map output from the convolutional hidden layer 1322a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1322a having a dimension of 24×24 nodes, the output from the pooling hidden layer 1322b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1300.

The final layer of connections in the network is a fully-connected layer that connects every node from the pooling hidden layer 1322b to every one of the output nodes in the output layer 1324. Using the example above, the input layer includes 28×28 nodes encoding the pixel intensities of the input image, the convolutional hidden layer 1322a includes 3×24×24 hidden feature nodes based on application of a 5×5 local receptive field (for the filters) to three activation maps, and the pooling hidden layer 1322b includes a layer of 3×12×12 hidden feature nodes based on application of max-pooling filter to 2×2 regions across each of the three feature maps. Extending this example, the output layer 1324 can include ten output nodes. In such an example, every node of the 3×12×12 pooling hidden layer 1322b is connected to every node of the output layer 1324.

The fully connected layer 1322c can obtain the output of the previous pooling hidden layer 1322b (which should represent the activation maps of high-level features) and determines the features that most correlate to a particular class. For example, the fully connected layer 1322c layer can determine the high-level features that most strongly correlate to a particular class, and can include weights (nodes) for the high-level features. A product can be computed between the weights of the fully connected layer 1322c and the pooling hidden layer 1322b to obtain probabilities for the different classes. For example, if the CNN 1300 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1324 can include an M-dimensional vector (in the prior example, M=10). M indicates the number of classes that the CNN 1300 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 14:
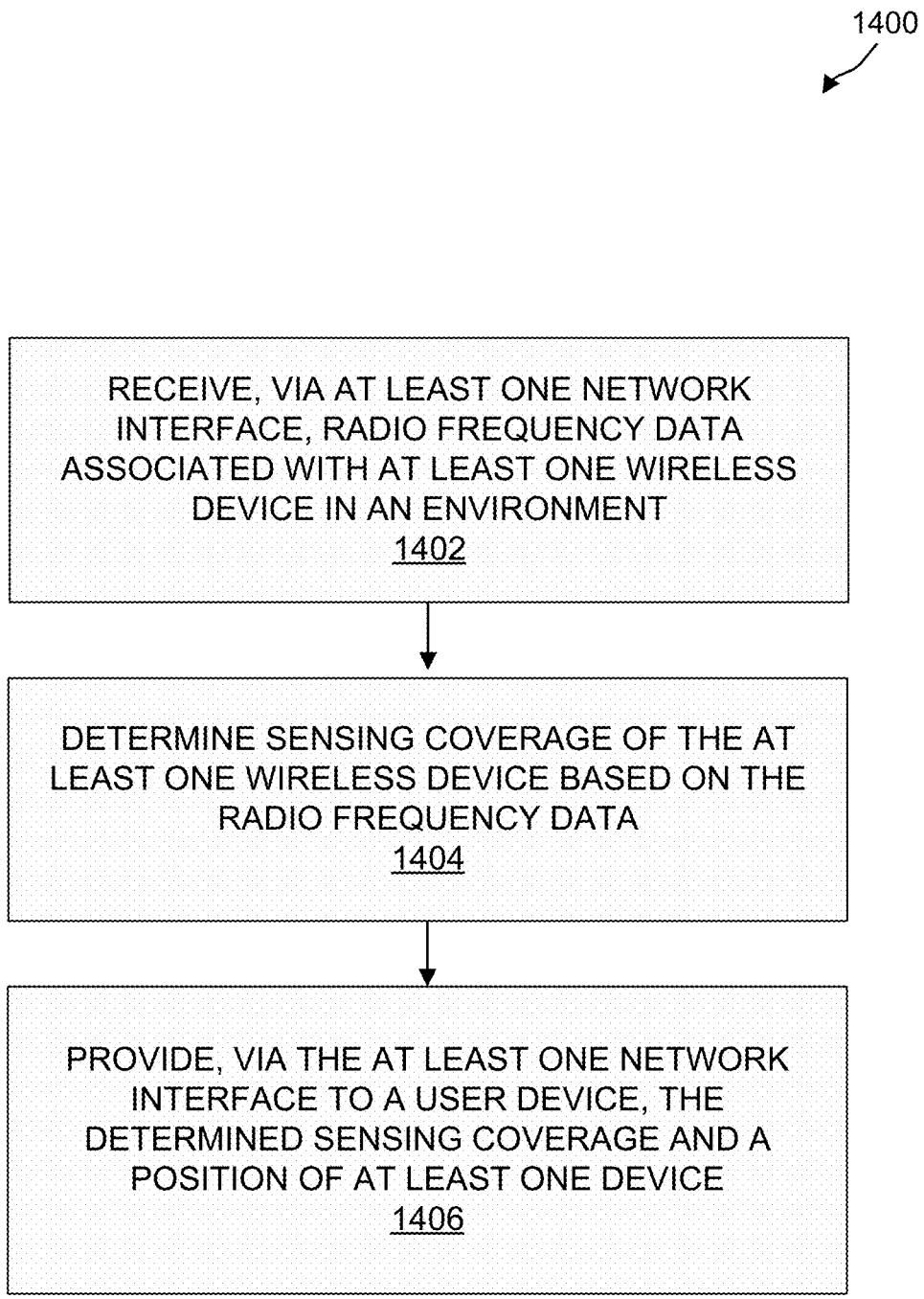
FIG. 14 illustrates an example flow diagram of a process for sensing radio frequency signals, in accordance with some examples.

FIG. 14 illustrates an example flow diagram of a process 1400 for sensing radio frequency signals, in accordance with some examples of the present disclosure. At operation 1402, the process 1400 can include receiving, by an apparatus, radio frequency data associated with at least one wireless device in an environment. As used herein, radio frequency data can include RF waveforms or signals, such as one or more RF waveforms that are reflected from one or more objects in an environment. Additionally, radio frequency data can include data (or metadata) pertaining to RF waveforms or signals, such as one or more various measurements that are made based on RF signals communicated between a transmitter and a receiver. In some aspects, radio frequency data can include various signal strength and/or quality metrics. By way of illustrative example, radio frequency data can include signal strength indicator (RSSI) data and/or channel state information data. In some aspects, the radio frequency data can include channel state information data that is based on channel variations induced by at least one object moving from a first location to a second location.

At operation 1404, the process 1400 can include determining sensing coverage of the at least one wireless device based on the radio frequency data. The sensing coverage is associated with detection of one or more objects in the environment. For example, the sensing coverage can be used to perform one or more radio frequency sensing based detection operations noted above, such as to detect the position of an object in the environment, to detect motion of the object, and/or other characteristic of the object.

At operation 1406, the process 1400 can include providing, to a user device, the sensing coverage and a position of at least one device. The at least one device includes at least one of the at least one wireless device, a second wireless device, or a combination thereof. The sensing coverage can include information (e.g., instructions) indicating how to position the at least one device. For instance, the sensing coverage can include an indication of how to position one or more existing sensing devices and/or one or more new sensing devices that can be added to a distributed network (e.g., a mesh network) of sensing devices.

In some cases, the sensing coverage is configured to be displayed by the user device. For example, the user device can display information associated with the sensing coverage (e.g., a message, instructions, etc. indicating how to position the at least one device). In some cases, the sensing coverage is color coordinated to indicate a quality of sensing coverage at one or more predetermined locations. For instance, the sensing coverage can include or include information associated with a sensing coverage heat map that can be displayed by the user device. In some examples, the sensing coverage is configured to be output by the at least one wireless device, or a combination thereof. For instance, the sensing coverage can include at least one of a visualization, an audible output, or a combination thereof indicative of the sensing coverage. The visualization of the sensing coverage can include a color-coded light indicative of a quality of the position of the at least one device. For instance, a sensing device can activate a color-coded light (e.g., a light-emitting diode) with a particular color indicating that a position of the sensing device is good or bad (e.g., green for good or red for bad).

In some examples, the process 1400 can further include determining a sensing coverage strength based on the sensing coverage by the at least one wireless device. In such examples, the sensing coverage can based on the sensing coverage strength. In another example, the process 1400 can include receiving radio frequency data from a measuring device. The radio frequency data from the measuring device can include received signal strength indicator data. In some aspects, the process 1400 can include determining at least one of a strength (e.g., RSSI), a quality (e.g., based on CSI data), or a combination thereof of the received radio frequency data.

In some cases, the radio frequency data from the measuring device can be based on a protocol. In one example, the process 1400 can include receiving a beacon from the at least one wireless device, and can determine RSSI and/or CSI measured from the beacons. In another example, the process 1400 can include transmitting one or more poll frames (e.g., a quality-of-service (QoS) null) to the at least one wireless device, and receiving an acknowledgment response from the at least one wireless device based on the one or more poll frames. The process 1400 can include determining an RSSI of the received acknowledgement response from the at least one wireless device. In some cases, the process 1400 can include determining the sensing coverage based on at least one of the strength, the quality, or a combination thereof of the received radio frequency data.

In some examples, the processes described herein (e.g., process 1400 and/or other process described herein) may be performed by a computing device or apparatus. In one example, the process 1400 can be performed by a computing device or the computing system 1500 shown in FIG. 15.

The computing device can include any suitable UE or device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 1400. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), Vision Processing Units (VPUs), Network Signal Processors (NSPs), microcontrollers (MCUs) and/or other suitable electronic circuits), and/or can include and/or be implemented using computer software, firmware, or any combination thereof, to perform the various operations described herein.

The process 1400 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1400 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 15:
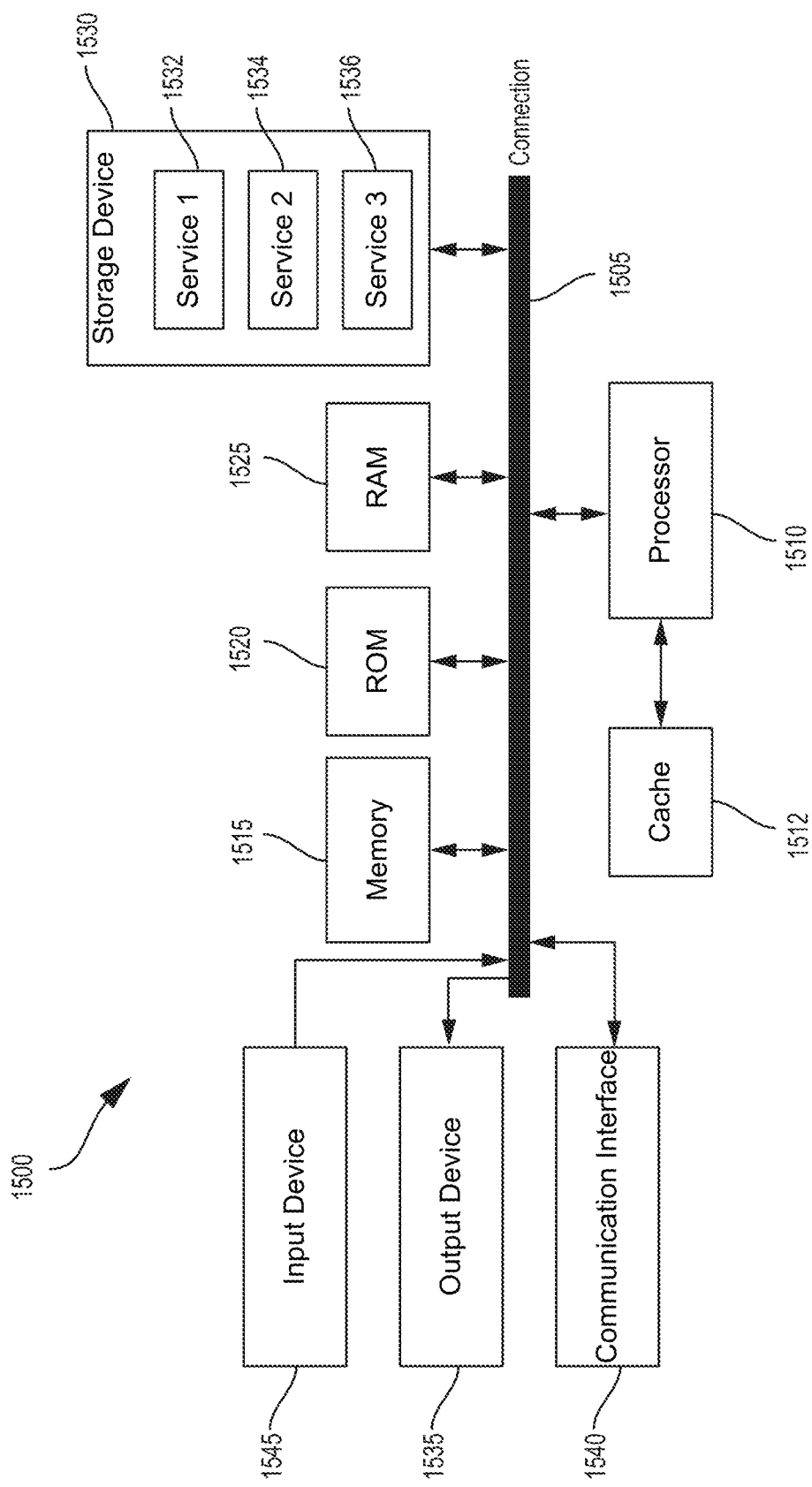
FIG. 15 illustrates an example computing system, in accordance with some examples.

FIG. 15 is a diagram illustrating an example of a system for implementing certain aspects of the present technology. In particular, FIG. 15 illustrates an example of computing system 1500, which can be for example any computing device making up internal computing system, a remote computing system, a camera, or any component thereof in which the components of the system are in communication with each other using connection 1505. Connection 1505 can be a physical connection using a bus, or a direct connection into processor 1510, such as in a chipset architecture. Connection 1505 can also be a virtual connection, networked connection, or logical connection.

In some embodiments, computing system 1500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1500 includes at least one processing unit (CPU or processor) 1510 and connection 1505 that couples various system components including system memory 1515, such as read-only memory (ROM) 1520 and random access memory (RAM) 1525 to processor 1510. Computing system 1500 can include a cache 1512 of high-speed memory connected directly with, in close proximity to, or integrated as part of processor 1510.

Processor 1510 can include any general purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which can represent any number of input mechanisms, such as a microphone for speech, a touch-sensitive screen for gesture or graphical input, keyboard, mouse, motion input, speech, etc. Computing system 1500 can also include output device 1535, which can be one or more of a number of output mechanisms. In some instances, multimodal systems can enable a user to provide multiple types of input/output to communicate with computing system 1500. Computing system 1500 can include communications interface 1540, which can generally govern and manage the user input and system output.

The communication/network interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1540 may also include one or more Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1530 can include software services, servers, services, etc., that when the code that defines such software is executed by the processor 1510, it causes the system to perform a function. In some embodiments, a hardware service that performs a particular function can include the software component stored in a computer-readable medium in connection with the necessary hardware components, such as processor 1510, connection 1505, output device 1535, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections.

Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include the following:

Aspect 1: An apparatus for determining sensing coverage, the apparatus comprising: at least one network interface; at least one memory; and at least one processor coupled to the at least one memory, the at least one processor being configured to: receive, via the at least one network interface, radio frequency data associated with at least one wireless device in an environment; determine sensing coverage of the at least one wireless device based on the radio frequency data; and provide, via the at least one network interface to a user device, the determined sensing coverage and a position of at least one device.

Aspect 2: The apparatus of aspect 1, wherein the at least one processor is further configured to: determine a sensing coverage strength based on the sensing coverage of the at least one wireless device, wherein the sensing coverage is based on the sensing coverage strength.

Aspect 3: The apparatus of any one of aspects 1 or 2, wherein the at least one processor is further configured to: receive, via the at least one network interface, radio frequency data from a measuring device, the radio frequency data from the measuring device comprising received signal strength indicator (RSSI) data.

Aspect 4: The apparatus of any one of aspects 1 to 3, wherein the at least one processor is further configured to: determine at least one of a strength, a quality, or a combination thereof of the received radio frequency data.

Aspect 5: The apparatus of aspect 4, wherein the at least one processor is further configured to: determine the sensing coverage based on at least one of the strength, the quality, or a combination thereof of the received radio frequency data.

Aspect 6: The apparatus of any one of aspects 1 to 5, wherein the radio frequency data received from the at least one wireless device includes channel state information data that is based on channel variations induced by at least one object moving from a first location to a second location.

Aspect 7: The apparatus of any one of aspects 1 to 6, wherein the sensing coverage includes instructions indicating how to position the at least one device.

Aspect 8: The apparatus of any one of aspects 1 to 7, wherein the sensing coverage is configured to be displayed by the user device.

Aspect 9: The apparatus of aspect 8, wherein the sensing coverage is color coordinated to indicate a quality of sensing coverage at one or more predetermined locations.

Aspect 10: The apparatus of any one of aspects 1 to 9, wherein the sensing coverage is configured to be output by the at least one wireless device, and wherein the sensing coverage includes at least one of a visualization, an audible output, or a combination thereof indicative of the sensing coverage.

Aspect 11: The apparatus of aspect 10, wherein the visualization of the sensing coverage includes a color-coded light indicative of a quality of the position of the at least one device.

Aspect 12: The apparatus of any one of aspects 1 to 11, wherein the at least one device includes at least one of the at least one wireless device, a second wireless device, or a combination thereof.

Aspect 13: A method for determining sensing coverage, the method comprising: receiving, by an apparatus, radio frequency data associated with at least one wireless device in an environment; determining sensing coverage of the at least one wireless device based on the radio frequency data; and providing, to a user device, the determined sensing coverage and a position of at least one device.

Aspect 14: The method of aspect 13, further comprising: determining a sensing coverage strength based on the sensing coverage of the at least one wireless device, wherein the sensing coverage is based on the sensing coverage strength.

Aspect 15: The method of any one of aspects 13 or 14, further comprising: receiving radio frequency data from a measuring device, the radio frequency data from the measuring device comprising received signal strength indicator (RSSI) data.

Aspect 16: The method of any one of aspects 13 to 15, further comprising: determining at least one of a strength, a quality, or a combination thereof of the received radio frequency data.

Aspect 17: The method of aspect 16, further comprising: determining the sensing coverage based on at least one of the strength, the quality, or a combination thereof of the received radio frequency data.

Aspect 18: The method of any one of aspects 13 to 17, wherein the radio frequency data received from the at least one wireless device includes channel state information data that is based on channel variations induced by at least one object moving from a first location to a second location.

Aspect 19: The method of any one of aspects 13 to 18, wherein the sensing coverage includes instructions indicating how to position the at least one device.

Aspect 20: The method of any one of aspects 13 to 19, wherein the sensing coverage is configured to be displayed by the user device.

Aspect 21: The method of aspect 20, wherein the sensing coverage is color coordinated to indicate a quality of sensing coverage at one or more predetermined locations.

Aspect 22: The method of any one of aspects 13 to 21, wherein the sensing coverage is configured to be output by the at least one wireless device, and wherein the sensing coverage includes at least one of a visualization, an audible output, or a combination thereof indicative of the sensing coverage.

Aspect 23: The method of aspect 22, wherein the visualization of the sensing coverage includes a color-coded light indicative of a quality of the position of the at least one device.

Aspect 24: The method of any one of aspects 13 to 23, wherein the at least one device includes at least one of the at least one wireless device, a second wireless device, or a combination thereof.

Aspect 25: A non-transitory computer-readable storage medium of an apparatus comprising at least one instruction for causing a computer or processor to: receive radio frequency data associated with at least one wireless device in an environment; determine sensing coverage of the at least one wireless device based on the radio frequency data; and provide, to a user device, the determined sensing coverage and a position of at least one device.

Aspect 26: The non-transitory computer-readable storage medium of aspect 25, further comprising at least one instruction for causing the computer or processor to: determine a sensing coverage strength based on the sensing coverage of the at least one wireless device, wherein the sensing coverage is based on the sensing coverage strength.

Aspect 27: The non-transitory computer-readable storage medium of any one of aspects 25 or 26, further comprising at least one instruction for causing the computer or processor to: receive radio frequency data from a measuring device, the radio frequency data from the measuring device comprising received signal strength indicator (RSSI) data.

Aspect 28: The non-transitory computer-readable storage medium of any one of aspects 25 to 27, further comprising at least one instruction for causing the computer or processor to: determine at least one of a strength, a quality, or a combination thereof of the received radio frequency data.

Aspect 29: The non-transitory computer-readable storage medium of aspect 28, further comprising at least one instruction for causing the computer or processor to: determine the sensing coverage based on at least one of the strength, the quality, or a combination thereof of the received radio frequency data.

Aspect 30: The non-transitory computer-readable storage medium of any one of aspects 25 to 29, wherein the radio frequency data received from the at least one wireless device includes channel state information data that is based on channel variations induced by at least one object moving from a first location to a second location.

Aspect 31: The non-transitory computer-readable storage medium of any one of aspects 25 to 30, wherein the sensing coverage includes instructions indicating how to position the at least one device.

Aspect 32: The non-transitory computer-readable storage medium of any one of aspects 25 to 31, wherein the sensing coverage is configured to be displayed by the user device.

Aspect 33: The non-transitory computer-readable storage medium of aspect 32, wherein the sensing coverage is color coordinated to indicate a quality of sensing coverage at one or more predetermined locations.

Aspect 34: The non-transitory computer-readable storage medium of any one of aspects 25 to 33, wherein the sensing coverage is configured to be output by the at least one wireless device, or a combination thereof, and wherein the sensing coverage includes at least one of a visualization, an audible output, or a combination thereof indicative of the sensing coverage.

Aspect 35: The non-transitory computer-readable storage medium of aspect 34, wherein the visualization of the sensing coverage includes a color-coded light indicative of a quality of the position of at least one device.

Aspect 36: The non-transitory computer-readable storage medium of any one of aspects 25 to 35, wherein the at least one device includes at least one of the at least one wireless device, a second wireless device, or a combination thereof.

Aspect 37: An apparatus for sensing radio frequency signals, comprising: means for receiving radio frequency data associated with at least one wireless device in an environment; means for determining sensing coverage of the at least one wireless device based on the radio frequency data; and means for providing, to a user device, the determined sensing coverage and a position of at least one device.

Aspect 38: The apparatus of aspect 37, further comprising: means for determining a sensing coverage strength based on the sensing coverage by the at least one wireless device, wherein the sensing coverage is based on the sensing coverage strength.

Aspect 39: The apparatus of any one of aspects 37 or 38, further comprising: means for receiving radio frequency data from a measuring device, the radio frequency data from the measuring device comprising received signal strength indicator data.

Aspect 40: The apparatus of any one of aspects 37 to 39, further comprising: means for determining at least one of a strength, a quality, or a combination thereof of the received radio frequency data.

Aspect 41: The apparatus of aspect 40, further comprising: means for determining the sensing coverage based on at least one of the strength, the quality, or a combination thereof of the received radio frequency data.

Aspect 42: The apparatus of any one of aspects 37 to 41, wherein the radio frequency data received from the at least one wireless device includes channel state information data that is based on channel variations induced by a at least one object moving from a first location to a second location.

Aspect 43: The apparatus of any one of aspects 37 to 42, wherein the sensing coverage includes instructions indicating how to position the at least one device.

Aspect 44: The apparatus of any one of aspects 37 to 43, wherein the sensing coverage is configured to be displayed by the user device.

Aspect 45: The apparatus of aspect 44, wherein the sensing coverage is color coordinated to indicate a quality of sensing coverage at one or more predetermined locations.

Aspect 46: The apparatus of any one of aspects 37 to 45, wherein the sensing coverage is configured to be output by the at least one wireless device, and wherein the sensing coverage includes at least one of a visualization, an audible output, or a combination thereof indicative of the sensing coverage.

Aspect 47: The apparatus of aspect 46, wherein the visualization of the sensing coverage includes a color-coded light indicative of a quality of the position of the at least one device.

Aspect 48: The apparatus of any one of aspects 37 to 47, wherein the at least one device includes at least one of the at least one wireless device, a second wireless device, or a combination thereof.

What is claimed is:

1. An apparatus for determining sensing coverage, the apparatus comprising:
   at least one network interface;
   at least one memory; and
   at least one processor coupled to the at least one memory, the at least one processor being configured to:
   receive, via the at least one network interface, radio frequency data associated with at least one wireless device in an environment;
   determine sensing coverage of the at least one wireless device based on the radio frequency data; and
   provide, via the at least one network interface to a user device, the determined sensing coverage and a position of at least one device.

2. The apparatus of claim 1, wherein the at least one processor is further configured to:
   determine a sensing coverage strength based on the sensing coverage of the at least one wireless device, wherein the sensing coverage is based on the sensing coverage strength.

3. The apparatus of claim 1, wherein the at least one processor is further configured to:
   receive, via the at least one network interface, the radio frequency data from a measuring device, the radio frequency data from the measuring device comprising received signal strength indicator (RSSI) data.

4. The apparatus of claim 1, wherein the at least one processor is further configured to:
   determine at least one of a strength, a quality, or a combination thereof of the received radio frequency data.

5. The apparatus of claim 4, wherein the at least one processor is further configured to:
   determine the sensing coverage based on at least one of the strength, the quality, or a combination thereof of the received radio frequency data.

6. The apparatus of claim 1, wherein the radio frequency data received from the at least one wireless device includes channel state information data that is based on channel variations induced by at least one object moving from a first location to a second location.

7. The apparatus of claim 1, wherein the sensing coverage includes instructions indicating how to position the at least one device.

8. The apparatus of claim 1, wherein the sensing coverage is configured to be displayed by the user device.

9. The apparatus of claim 8, wherein the sensing coverage is color coordinated to indicate a quality of sensing coverage at one or more predetermined locations.

10. The apparatus of claim 1, wherein the sensing coverage is configured to be output by the at least one wireless device, and wherein the sensing coverage includes at least one of a visualization, an audible output, or a combination thereof indicative of the sensing coverage.

11. The apparatus of claim 10, wherein the visualization of the sensing coverage includes a color-coded light indicative of a quality of the position of the at least one device.

12. The apparatus of claim 1, wherein the at least one device includes at least one of the at least one wireless device, a second wireless device, or a combination thereof.

13. A method for determining sensing coverage, the method comprising:
   receiving, by an apparatus, radio frequency data associated with at least one wireless device in an environment;
   determining sensing coverage of the at least one wireless device based on the radio frequency data; and
   providing, to a user device, the determined sensing coverage and a position of at least one device.

14. The method of claim 13, further comprising:
   determining a sensing coverage strength based on the sensing coverage of the at least one wireless device, wherein the sensing coverage is based on the sensing coverage strength.

15. The method of claim 13, further comprising:
   receiving the radio frequency data from a measuring device, the radio frequency data from the measuring device comprising received signal strength indicator (RSSI) data.

16. The method of claim 13, further comprising:
   determining at least one of a strength, a quality, or a combination thereof of the received radio frequency data.

17. The method of claim 16, further comprising:
   determining the sensing coverage based on at least one of the strength, the quality, or a combination thereof of the received radio frequency data.

18. The method of claim 13, wherein the radio frequency data received from the at least one wireless device includes channel state information data that is based on channel variations induced by at least one object moving from a first location to a second location.

19. The method of claim 13, wherein the sensing coverage includes instructions indicating how to position the at least one device.

20. The method of claim 13, wherein the sensing coverage is configured to be displayed by the user device.

21. The method of claim 20, wherein the sensing coverage is color coordinated to indicate a quality of sensing coverage at one or more predetermined locations.

22. The method of claim 13, wherein the sensing coverage is configured to be output by the at least one wireless device, and wherein the sensing coverage includes at least one of a visualization, an audible output, or a combination thereof indicative of the sensing coverage.

23. The method of claim 22, wherein the visualization of the sensing coverage includes a color-coded light indicative of a quality of the position of the at least one device.

24. The method of claim 13, wherein the at least one device includes at least one of the at least one wireless device, a second wireless device, or a combination thereof.

25. A non-transitory computer-readable storage medium of an apparatus comprising at least one instruction for causing a computer or processor to:
   receive radio frequency data associated with at least one wireless device in an environment;
   determine sensing coverage of the at least one wireless device based on the radio frequency data; and
   provide, to a user device, the determined sensing coverage and a position of at least one device.

26. The non-transitory computer-readable storage medium of claim 25, further comprising at least one instruction for causing the computer or processor to:
   determine a sensing coverage strength based on the sensing coverage of the at least one wireless device, wherein the sensing coverage is based on the sensing coverage strength.

27. The non-transitory computer-readable storage medium of claim 25, further comprising at least one instruction for causing the computer or processor to:
   receive the radio frequency data from a measuring device, the radio frequency data from the measuring device comprising received signal strength indicator (RSSI) data.

28. The non-transitory computer-readable storage medium of claim 25, further comprising at least one instruction for causing the computer or processor to:
   determine at least one of a strength, a quality, or a combination thereof of the received radio frequency data.

29. The non-transitory computer-readable storage medium of claim 28, further comprising at least one instruction for causing the computer or processor to:
   determine the sensing coverage based on at least one of the strength, the quality, or a combination thereof of the received radio frequency data.

30. The non-transitory computer-readable storage medium of claim 25, wherein the radio frequency data received from the at least one wireless device includes channel state information data that is based on channel variations induced by at least one object moving from a first location to a second location.

31. The non-transitory computer-readable storage medium of claim 25, wherein the sensing coverage includes instructions indicating how to position the at least one device.

32. The non-transitory computer-readable storage medium of claim 25, wherein the sensing coverage is configured to be displayed by the user device.

33. The non-transitory computer-readable storage medium of claim 32, wherein the sensing coverage is color coordinated to indicate a quality of sensing coverage at one or more predetermined locations.

34. The non-transitory computer-readable storage medium of claim 25, wherein the sensing coverage is configured to be output by the at least one wireless device, or a combination thereof, and wherein the sensing coverage includes at least one of a visualization, an audible output, or a combination thereof indicative of the sensing coverage.

35. The non-transitory computer-readable storage medium of claim 34, wherein the visualization of the sensing coverage includes a color-coded light indicative of a quality of the position of the at least one device.

36. The non-transitory computer-readable storage medium of claim 25, wherein the at least one device includes at least one of the at least one wireless device, a second wireless device, or a combination thereof.

37. An apparatus for sensing radio frequency signals, comprising:
   means for receiving radio frequency data associated with at least one wireless device in an environment;
   means for determining sensing coverage of the at least one wireless device based on the radio frequency data; and means for providing, to a user device, the determined sensing coverage and a position of at least one device.

38. The apparatus of claim 37, further comprising:
means for determining a sensing coverage strength based on the sensing coverage by the at least one wireless device, wherein the sensing coverage is based on the sensing coverage strength.

39. The apparatus of claim 37, further comprising:
means for receiving the radio frequency data from a measuring device, the radio frequency data from the measuring device comprising received signal strength indicator data.

40. The apparatus of claim 39, further comprising:
means for determining at least one of a strength, a quality, or a combination thereof of the received radio frequency data.

41. The apparatus of claim 40, further comprising:
means for determining the sensing coverage based on at least one of the strength, the quality, or a combination thereof of the received radio frequency data.

42. The apparatus of claim 37, wherein the radio frequency data received from the at least one wireless device includes channel state information data that is based on channel variations induced by a at least one object moving from a first location to a second location.

43. The apparatus of claim 37, wherein the sensing coverage includes instructions indicating how to position the at least one device.

44. The apparatus of claim 37, wherein the sensing coverage is configured to be displayed by the user device.

45. The apparatus of claim 44, wherein the sensing coverage is color coordinated to indicate a quality of sensing coverage at one or more predetermined locations.

46. The apparatus of claim 37, wherein the sensing coverage is configured to be output by the at least one wireless device, and wherein the sensing coverage includes at least one of a visualization, an audible output, or a combination thereof indicative of the sensing coverage.

47. The apparatus of claim 46, wherein the visualization of the sensing coverage includes a color-coded light indicative of a quality of the position of the at least one device.

48. The apparatus of claim 37, wherein the at least one device includes at least one of the at least one wireless device, a second wireless device, or a combination thereof.

* * * * *